United States Patent
Otsuka et al.

[11] Patent Number: 5,715,471
[45] Date of Patent: Feb. 3, 1998

[54] PARALLEL COMPUTER

[75] Inventors: Tatsushi Otsuka; Hideki Yoshizawa; Katsuhito Fujimoto, all of Kawasaki, Japan

[73] Assignee: Fujitsu Limited, Kawasaki, Japan

[21] Appl. No.: 381,399

[22] Filed: Jan. 31, 1995

[30] Foreign Application Priority Data

Mar. 14, 1994 [JP] Japan ................... 6-042322

[51] Int. Cl.$^6$ .................. G06F 17/12; G06F 17/16
[52] U.S. Cl. ..................... 395/800; 395/200.21
[58] Field of Search .............. 395/800, 200.01, 395/200.21, 650; 370/85.15, 85; 340/825.05

[56] References Cited

U.S. PATENT DOCUMENTS

| | | | |
|---|---|---|---|
| 4,247,892 | 1/1981 | Lawrence | 395/200.01 |
| 4,591,981 | 5/1986 | Kassabov | 395/800 |
| 4,663,706 | 5/1987 | Allen et al. | 395/200.13 |
| 4,763,247 | 8/1988 | Borovski et al. | 395/200.01 |
| 5,274,832 | 12/1993 | Khan | 395/800 |
| 5,465,375 | 11/1995 | Thepaut et al. | 395/800 |

*Primary Examiner*—Larry D. Donaghue
*Attorney, Agent, or Firm*—Staas & Halsey

[57] ABSTRACT

A parallel computer includes a sequence of adjacent nodes, with each node including at least first and second processing elements and each processing element including a memory. The nodes are sequentially added or replaced in a node order and the processing elements are sequentially connected to form a single ring data path. First matrix data elements are sequentially assigned to adjacent processing elements along the single ring data path and second matrix data element groups are sequentially assigned to processing elements in the node order. The first matrix data elements are then accumulated with the second matrix data element groups as the first matrix data elements are rotated along the single ring data path. Accordingly, accumulation results are maintained within the memories of the lowest order nodes such that the nodes may added or replaced without relocation of data.

16 Claims, 19 Drawing Sheets

PARALLEL COMPUTER

BACKGROUND OF THE INVENTION

1. Field of the Invention

The present invention relates to a parallel computer for the purpose of achieving efficient processing in a ring network, made up of a plurality of nodes, which perform processing assigned to them while performing mutual transfer of data held by the nodes over forward and return paths.

2. Description of the Related Art

A parallel computer system is made up of a parallel computer which performs high-speed calculation and a host computer which controls the parallel computer. The parallel computer is made up of a number of nodes, each node having two processing elements and two memories, and each of the processing elements constituting one processing unit in the parallel processing. One of these processing elements is connected to the out-going path in the ring network, and the other processing element is connected to the in-coming path in the ring network. The processing elements constitute unit elements of data processing and transfer in the ring network, these processing elements executing data processing consecutively and passing the results of that processing to a neighboring processing element on the ring.

The host computer has a host bus to which each of the processing elements of the parallel computer is directly linked, with this host computer performing data setting, data readout, and control of processing with respect to the parallel computer. The problem to be processed is received by the host computer, the corresponding program and data is loaded into the memories of each of the processing elements within the parallel computer, and the host computer causes the processing elements to execute this program. After this processing is completed, the host computer reads out the results of the execution from the memories of each of the processing elements, and outputs the final results of the processing.

However, in the prior art as described above, in the case in which, during processing, a larger scale of processing becomes necessary, it was necessary to add nodes to the network to execute that processing, this making it necessary to change the flow of data on the ring with respect to each of the processing elements. In such a case, the host computer, which is aware of all the data, interrupts the processing at the parallel computer and must update the memories of each of the processing elements for the purpose of relocation of the data, this resulting in a significant loss of high-speed performance in the parallel computer.

To avoid a problem such as described above, it is possible to use a fixed configuration using a number of processing elements that can handle the largest scale processing of a given series of processing tasks. However, doing this requires that data pass through all the processing elements, even in the case of small-scale processing, thereby wasting unnecessary data transfer time.

SUMMARY OF THE INVENTION

The present invention was made to avoid the above-described problem in the prior art, and has as an object the provision of a parallel computer capable of performing high-speed processing without requiring the relocation of data, even if the network configuration is changed.

The present invention provides a parallel computer in which each node has at least two processing elements, and wherein the nodes form a ring network having an out-going path and an in-coming path which pass through each node, the data held by the processing elements of each node being transferred between each of the processing elements and processed by the processing elements, wherein a processing program for the purpose of sequentially processing data transferred on the network is assigned sequentially from at least two processing elements provided in each of the nodes, in the sequence of node numbers which are applied in the sequence of node connections.

Additionally, the present invention provides a parallel computer in which each node has at least two processing elements, and wherein the nodes form a ring network having an out-going path and an in-coming path which pass through each node, the data held by the processing elements of each node being transferred between each of the processing elements and processed by the processing elements, and wherein a processing program for the purpose of sequentially processing data transferred on the network is assigned sequentially from at least two processing elements provided in each of the nodes, in the sequence of node numbers which are applied in the sequence of node connections and data with respect to these processing elements are sequentially located from at least two processing elements provided in each of the nodes, in the sequence of node numbers which are applied in the sequence of node connections.

As noted above, by assigning the processing program (which processes data which is transferred sequentially on the network from the processing elements which are provided in each node) in the sequence of nodes, the present invention is capable of establishing processor assignments uniformly, in a manner which is not dependent upon the network configuration.

In addition, because sequential data is allocated from each of the processing elements provided at the nodes in node sequence, even if the network configuration changes, it is not necessary to relocate data, thereby enabling high-speed processing.

BRIEF DESCRIPTION OF THE DRAWINGS

The present invention will be more clearly understood from the descriptions as set forth below, with reference to the following accompanying drawings.

DESCRIPTION OF THE PREFERRED EMBODIMENTS

Before describing the preferred embodiments according to the present invention, examples of the related art are provided, with reference made to FIGS. 1 to 9.

Figure 1:
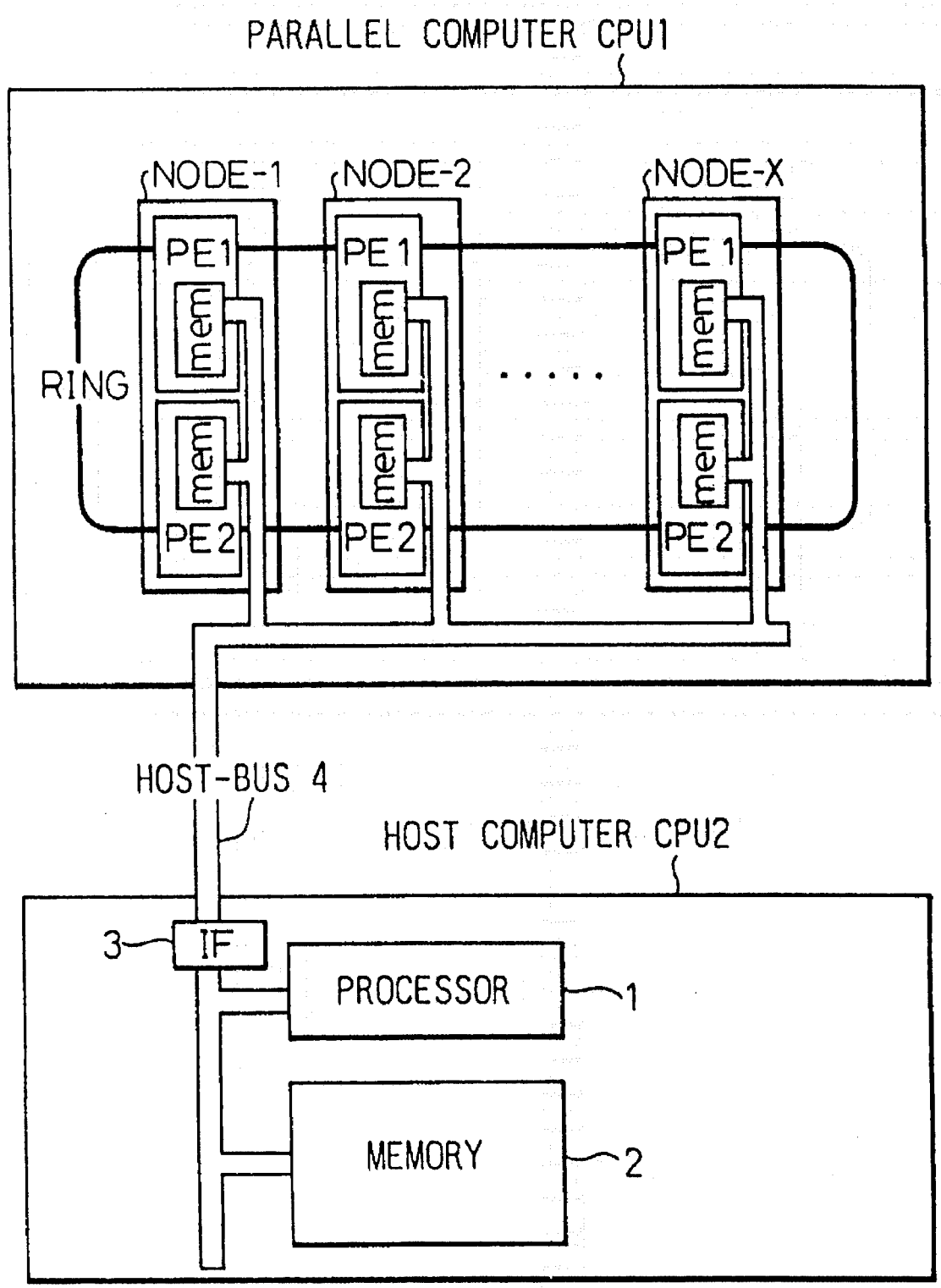
FIG. 1 is a drawing which shows the configuration of the system which is a prerequisite for the present invention.

FIG. 1 shows the configuration of a system having a parallel computer which forms the prerequisite of the present invention. In this drawing, CPU1 is a parallel computer which has a ring network, CPU2 is a host computer, 1 is a host computer processor, 2 is a main memory of the host computer, and 3 is an interface.

The processing elements PE1 and PE2 which form each of the nodes Node-1, Node-2, ..., Node-x of the parallel computer CPU1 each consist of processing elements and memories, and each represents one unit of parallel processing. As noted above, each of the nodes Node-1, Node-2, ..., Node-x has two processing elements PE1 and PE2, these representing units of data transfer on the ring network.

The parallel computer CPU1 has nodes Node-1, Node-2, ..., Node-x linked in a ring network, in which data is circulated as each of the processing elements PE1 and PE2 perform processing, to arrive at the final processing results of, for example, a matrix calculation.

The host computer CPU2 has a host bus 4, which is directly linked to each of the processing elements of the parallel computer CPU1, and with respect to the parallel computer CPU1, the host computer CPU2 performs data setting, data readout, and control of processing.

The problem that is to be processed is received by the host computer CPU2, which loads the program and data into the memories mem of each of the processing elements PE1 and PE2 of the parallel computer CPU1, after which, this program is executed by the parallel computer CPU1. After the processing is completed, the results of this execution are read from the memories mem of each of the processing elements by the host computer CPU2 into the memory 2 of the host computer CPU2.

Figure 2:
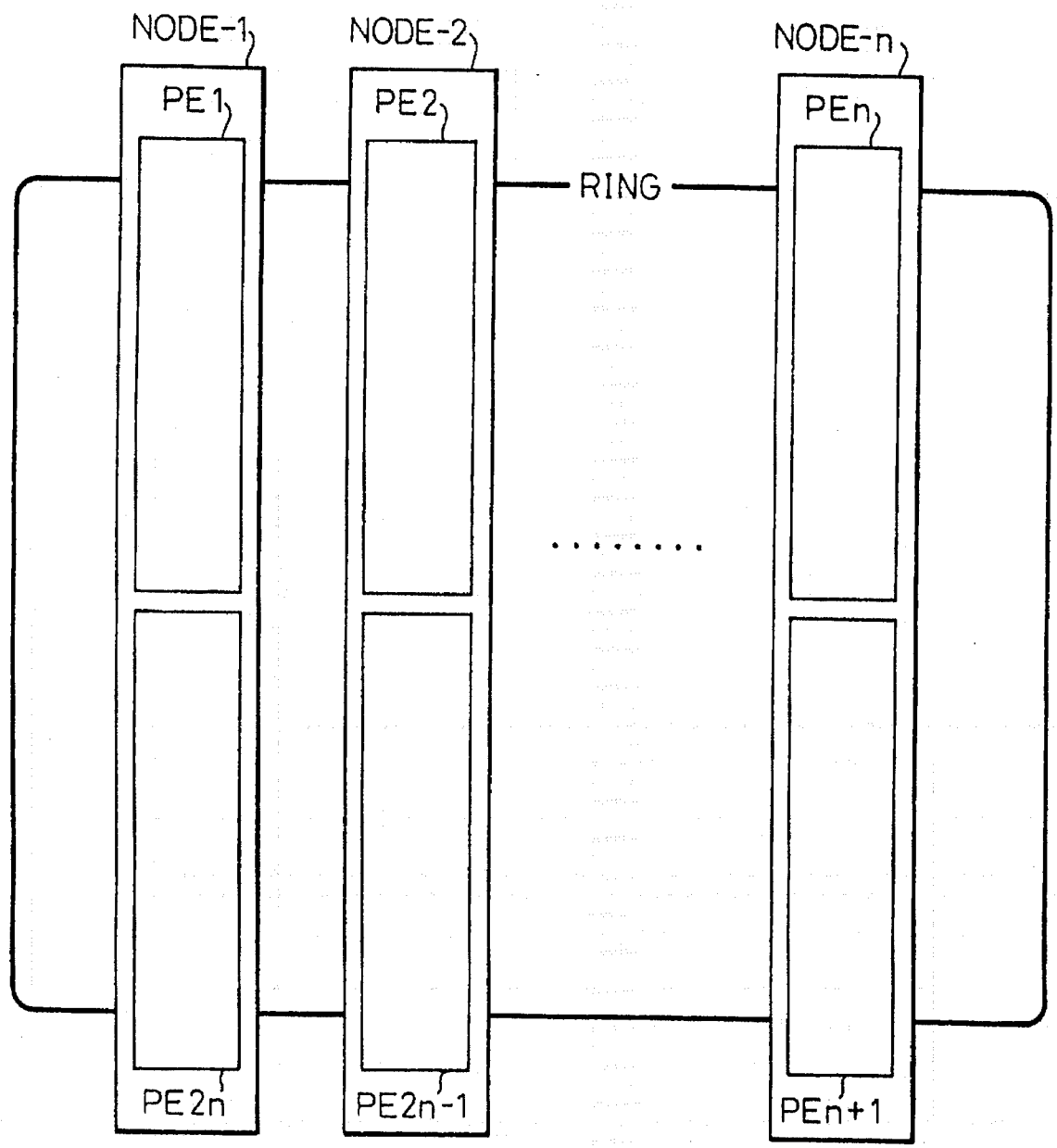
FIG. 2 is a drawing which shows the ring network configuration which is a prerequisite for the present invention.

FIG. 2 shows the configuration of the ring network which uses the parallel computer CPU1 that is the prerequisite for the present invention, and which has an out-going path and an in-coming path which pass through it.

In FIG. 2, Node-1, ..., Node-n are the nodes of the ring network, these nodes Node-1, ..., Node-n each having two processing elements. The processing elements of each of the nodes, as shown in FIG. 2, are connected so as to form a ring network. Each of the processing elements has assigned to it a number in the sequence PE1, PE2, ..., PE2n-1, PE2n, according to the sequence in which the processing elements are physically connected in the ring network, with data being distributed and located in the network in this sequence as well.

Figure 3:
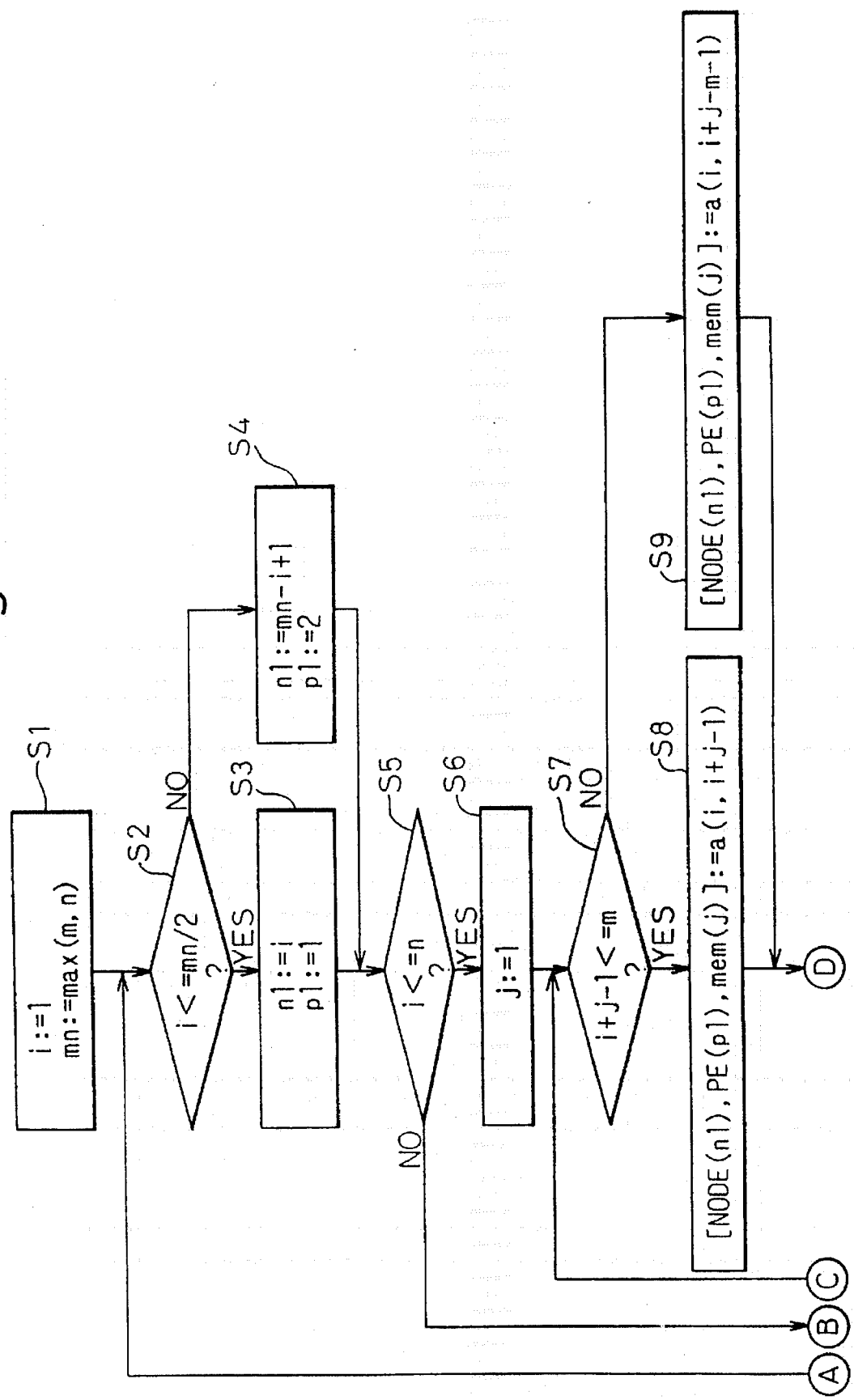
FIG. 3 is a flowchart of the data location processing in the prior art.
Figure 4:
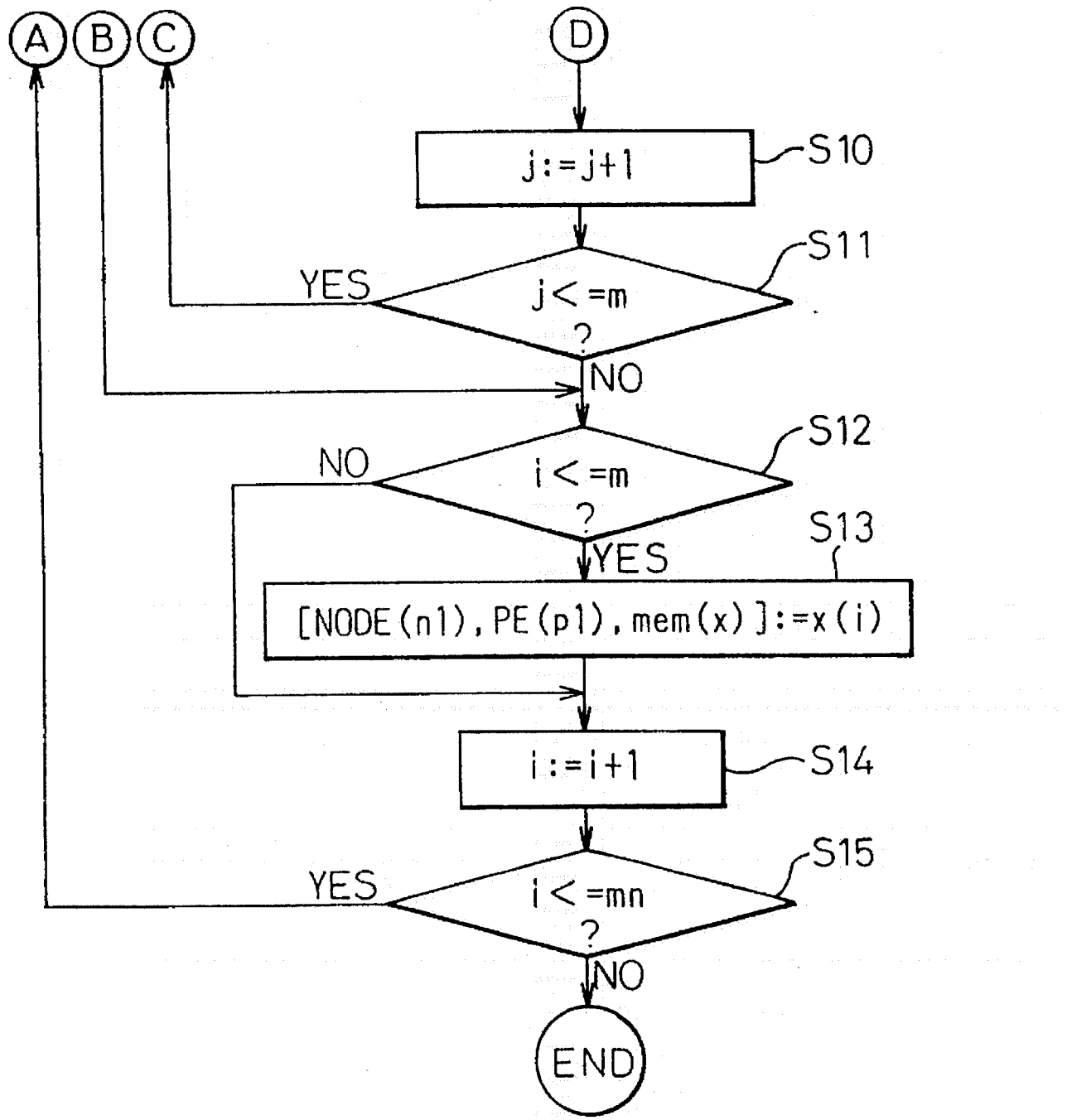
FIG. 4 is a continued flowchart of the data location processing in the prior art.

FIG. 3 and FIG. 4 show a flowchart of the processing for the purpose of performing data location into each of the processing elements in the case in which the matrix calculation shown be Equation (1) below is performed. To simplify the flowchart shown in these drawings, both n and m are indicated as even numbers. In the case in which n and m are odd numbers, processing to handle the exceptional case in which free processing elements are discovered would be added, but the flowchart would not be substantially different from that shown in the above-noted drawings.

$$\begin{pmatrix} y_1 \\ y_2 \\ \cdot \\ \cdot \\ \cdot \\ y_n \end{pmatrix} = \begin{pmatrix} a_{11} & a_{12} & \cdots & a_{1m} \\ a_{21} & a_{22} & \cdots & a_{2m} \\ \cdot & \cdot & & \cdot \\ \cdot & \cdot & & \cdot \\ \cdot & \cdot & & \cdot \\ a_{n1} & a_{n2} & & a_{nm} \end{pmatrix} \begin{pmatrix} x_1 \\ x_2 \\ \cdot \\ \cdot \\ \cdot \\ x_m \end{pmatrix} \quad (1)$$

What follows is a description of the data location into the processing elements in the prior art, with reference made to the above-noted flowchart. In the description which follows, as an aid to understanding, the description is that of the example of a matrix in which m=6 and n=4.

At step S1 in FIG. 3, i=1 and mn-max (m, n), that is, ran is the larger of the two values m and n, which in this case means it is set to 6. At step S2, a test is made to see if i≦mn/2 is true. If it is, that is, in this example if i is 3 or smaller, at step S3 the settings of n1=i and p1=1 are made. If, however, i>mn/2, that is in this example if i is greater than 3, at step S4 the settings of n1=mn−i+1 and p1=2 are made.

Then, at step S5, a test of i≦n is made, and in the case of i>n, processing proceeds to step S12 of FIG. 4, which will described later. In the case of i≦n, flow proceeds to step S6, at which the setting j=1 is made.

At step S7, a test of i+j−1≦m is made, and if this expression is true flow proceeds to step S8, at which the setting NODE(n1), PE(p1), men(j)=a(i, i+j−1) is made. That is, the a(1, 1) data is located in the 1st area of the memory mere of the processing element PE(1) of Node-1.

When the above processing has been completed, flow moves to step S10 of FIG. 4, at which the setting j=j+1 is made, and at step S11 a test of j≦m is made. If j≦m is true, the flow returns to step S7 from which the above-described processing is performed. By doing this, data a(1, 2) is located in the 2nd area of the memory mere of the processing element PE(1) of Node-1.

The same type of processing is repeated, and when j=6 the a(1, 6) data is located in the 6th area of the memory mere of the processing element PE(1) of Node-1.

By means of the above-described processing, the a(1, 1), a(1, 2), a(1, 3), a(1, 4), a(1, 5), and a(1, 6) data are located in the 1st through 6th areas of the memory mem of the processing element PE(1) of Node-1. After that, at step S10 j is incremented by the expression j=j+1, causing j to exceed 6, so that flow goes from step S11 to step S12, where the expression i≦m is tested. In this case, since i≦m, flow proceeds to step S13, at which the setting NODE(n1), PE(p1), mem(x)=x(i) is made. That is, the x(1) data is located into the x area of the memory mere of processing element PE(1) of Node-1.

Next, at step S14, i is incremented by the expression i=i+1, and at step S15 a test is made of the expression i≦mn. If i≦mn, the flow returns to step S2, from which the above-noted processing is repeated. By doing this, the above-described data are located in the memory mere of the processing element PE(1) of Node-2.

With i=2, when j reaches 6, because i+j−1>m at step B7, flow proceeds to step S9, at which the setting NODE(n1), PE(P1), mem(j)=a(i,i+j−m−1) is made. That is, the a(2, 1) data is located into the 6th area of the memory mem of the processing element PE(1) of Node-2.

By means of the above-described processing, the a(2, 2), a(2, 3), a(2, 4), a(2, 5), a(2, 6), and a(2, 1) data are located in the 1st through 6th areas of the memory mere, and the x(2) data is located in the x area of the memory mere of the processing element PE(1) of Node-2.

By performing the same type of processing, the a(3, 3), a(3, 4), a(3, 5), a(3, 6), a(3, 1), and a(3, 2) data are located in the 1st through 6th areas of the memory mem, and the x(3) data is located in the x area of the memory mere of the processing element PE(1) of Node-3.

Next, at step S2 when i>mn/2, that is, when i=4, flow proceeds to step S4, at which the settings n1=mn−i+1, that is n1=3 and p1=2, is made, and at step S5 through step S11 the above-described processing is repeated for j=1 to j=6. By doing this, the a(4, 4), a(4, 5), a(4, 6), a(4, 1), a(4, 2), and a(4, 3) data are located in the 1st through 6th areas of the memory mem, and the x(4) data is located in the x area of the memory mere of the processing element PE(2) of Node-3.

After performing the above-described processing, at step S14, i is incremented by 1 (thereby becoming 5), and after making the settings of n1=mn−i+1=2 and P1=2, flow proceeds to step S5 at which i>n (in this case n is 4), so that data is not located in the 1st to 6th areas of the memory mem of the processing element PE(2) of Node-2, flow proceeding to step S12, at which the x(5) data is located in the x area of the memory mere of the processing element PE(2) of Node-2.

In the same manner, when i reaches 6, x(6) data is located into the x area of the memory mere of the processing element PE(2) of Node-1, and since i<mn, flow proceeds from step S15 to the END.

By performing the above-described processing, the data a(1, 1) to a(1, 6), a(2, 2) to a(2, 1), a(3, 3) to a(3, 2), and a(4, 4) to a(4, 3) are located in the 1st to 6th areas of the memory mem of processing element PE(1) of Node-1 to Node-3 and processing element PE(2) of Node-3, and x(1) to x(6) data are located into the x area of processing element PE(1) of Node-1 to Node-3 and processing element PE(2) of Node-3 to Node-1.

What follows is a description of an example of calculating, using the above ring network, the sum of the products of a matrix W having 2n rows and 2n columns with a vector x having 2n elements.

Figure 5:
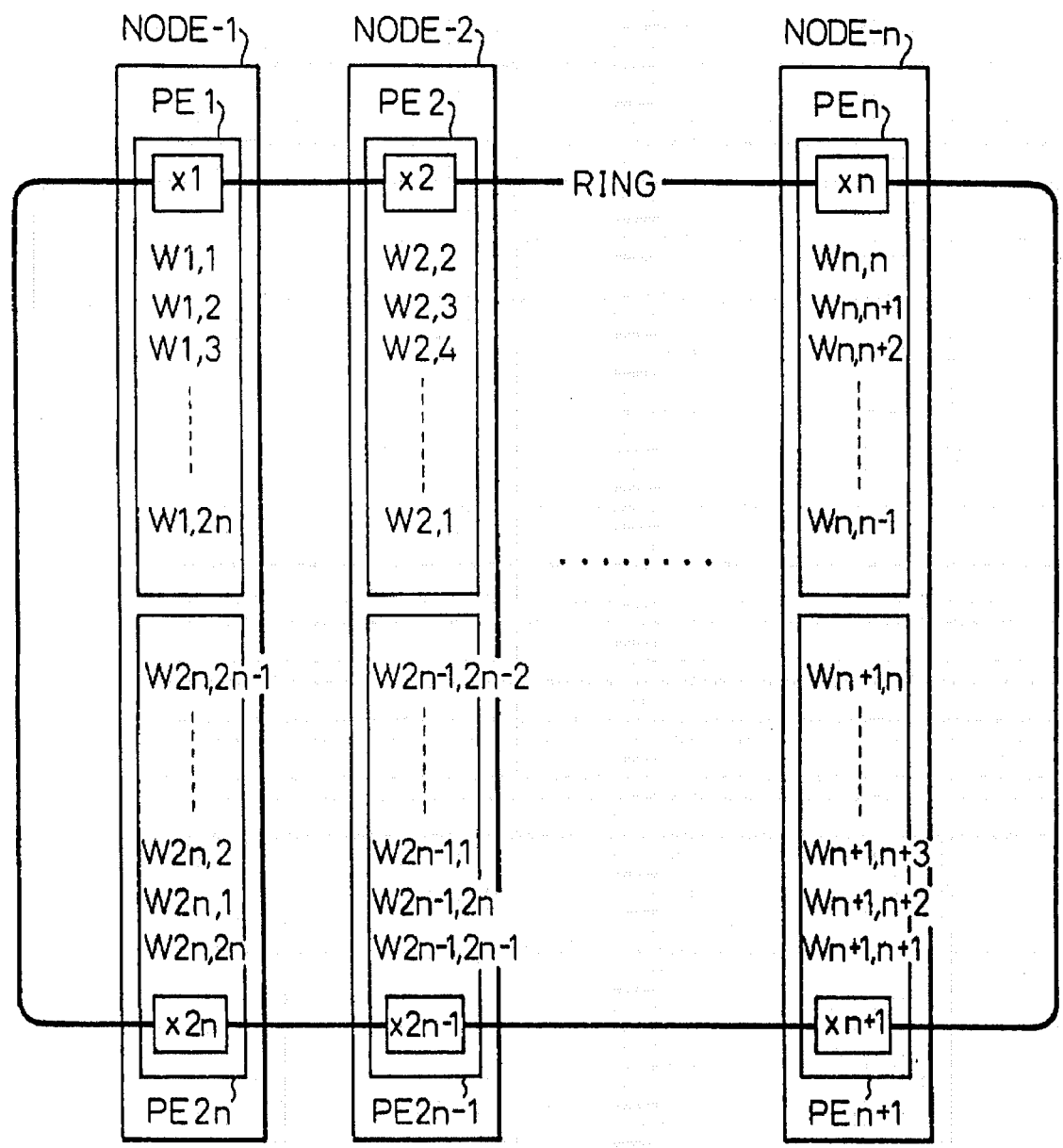
FIG. 5 is a drawing which shows the location of data in a ring network of the past.

First, as shown in FIG. 5, the matrix elements $W_{ij}$ (i=1, ..., 2n, j=1, ..., 2n) of each of the rows of the matrix W are given to each of the processing elements, the vector elements $x_j$ (j=1, ..., 2n) of the vector x being located on the ring, and the calculation being performed as follows.

Figure 6:
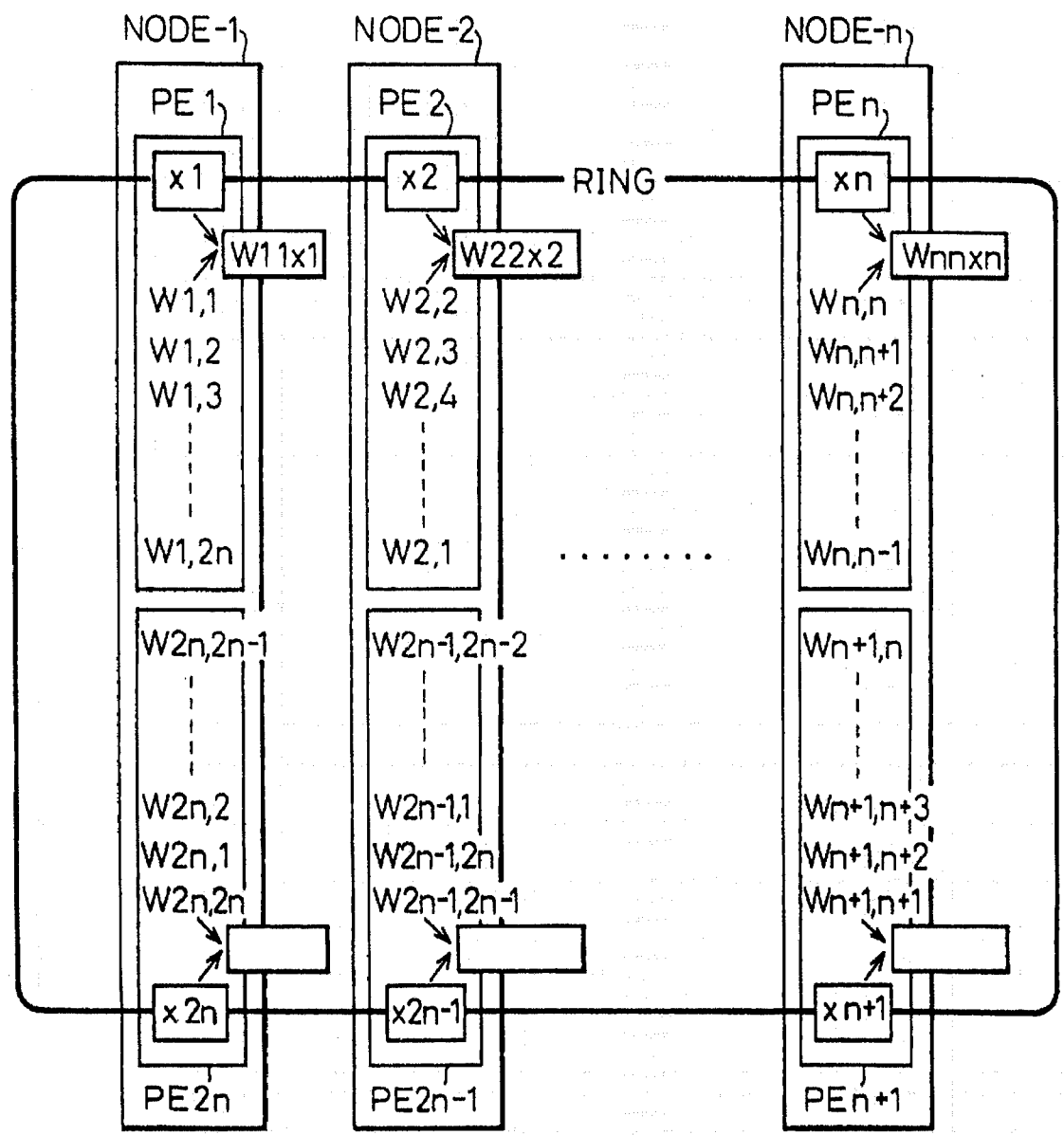
FIG. 6 is a drawing which shows accumulation processing in a ring network of the past.

<1> As shown in FIG. 6, each processing element PE(1 ... 2n) on the ring captures an appropriate value of data from vector $x_j$ on the ring, this being accumulated with corresponding internally stored matrix element $W_{ij}$, the result written into an internal work area.

Figure 7:
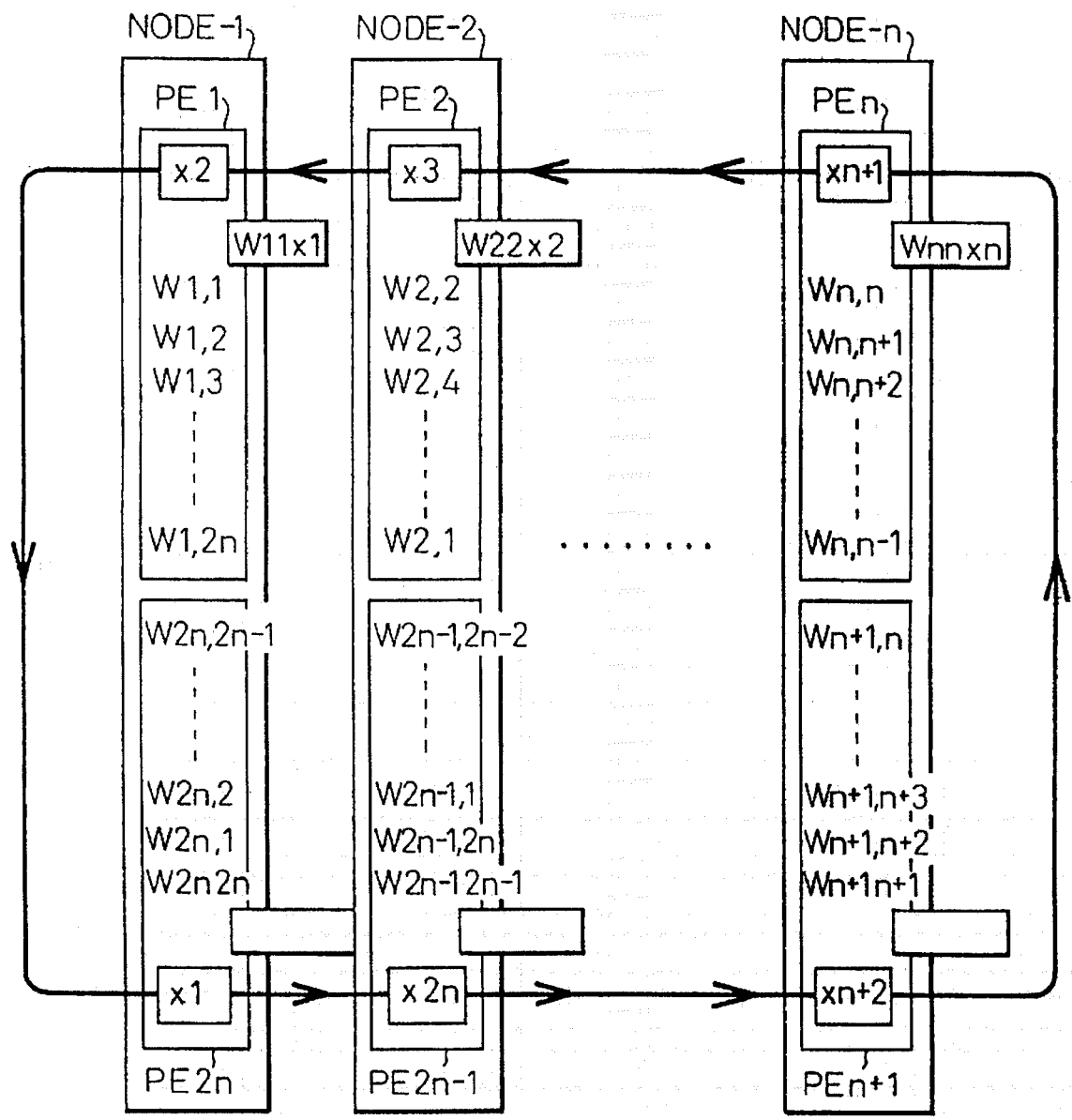
FIG. 7 is a drawing which shows transfer processing in a ring network of the past.

<2> All of the data from vector $x_j$ are shifted by one stage on the ring. As a result, the data locations on the ring are as shown in FIG. 7.

Figure 8:
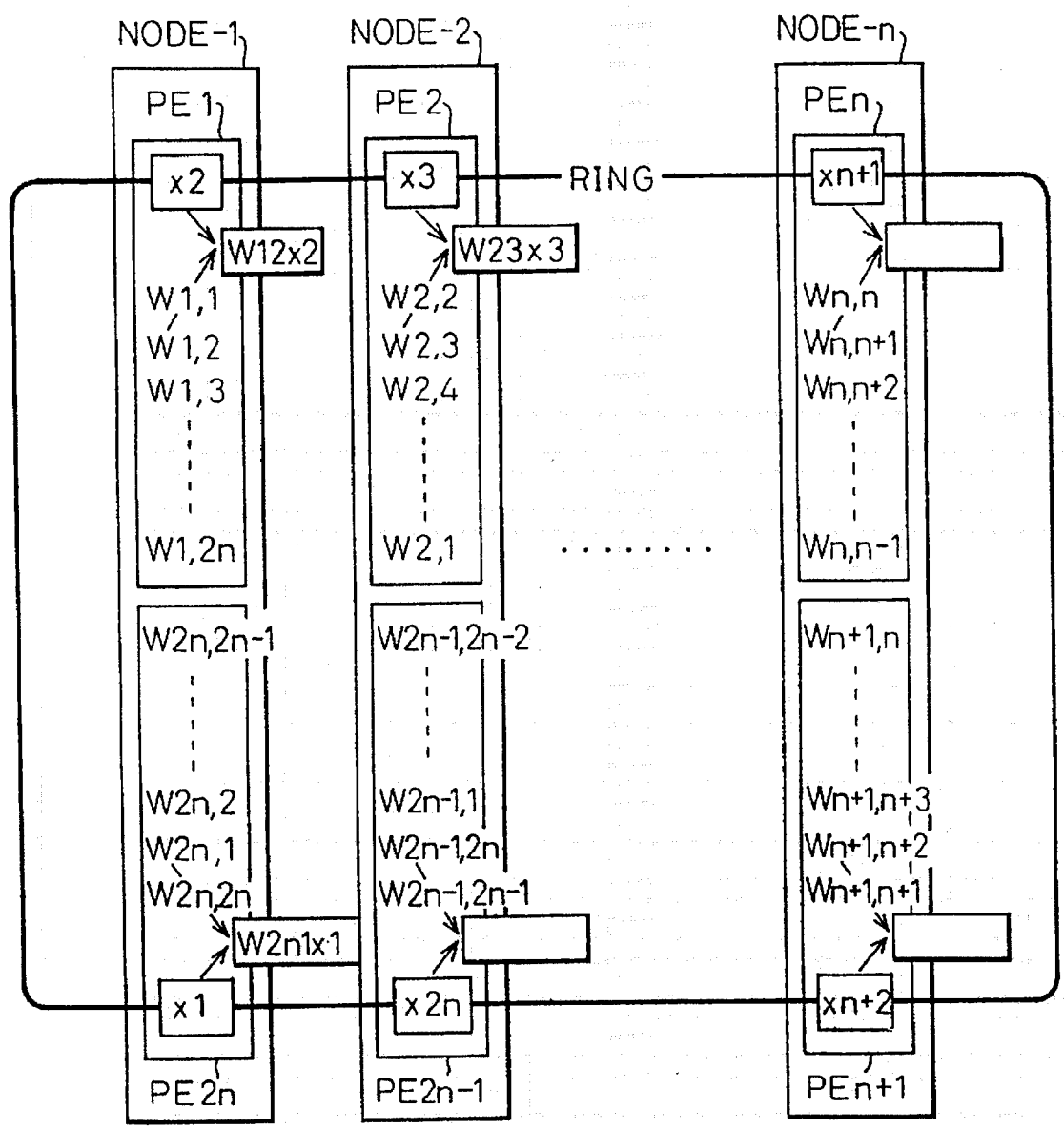
FIG. 8 is a drawing which shows accumulation processing in the next stage of a ring network of the past.

<3> Then, as shown in FIG. 8, each processing element PE(1 ... 2n) again captures an appropriate value of data from vector $x_j$ after the shift, this value is accumulated with the next matrix element $W_{ij}$ held internally, the result is added to the previous result the internal work area and this new result is written into the internal work area.

<4> The above processing is then repeated for all of the data.

In FIG. 2, a ring network is configured in which the ring passes through n nodes, with processing being performed by 2n processing elements. One of the characteristics of a ring network in which there is an out-going path and an in-coming path, such as shown in FIG. 2, is that it is possible to change the number of nodes through which the ring passes and, by doing so, it is possible to perform a sequence of matrix calculations for matrices of differing sizes.

Figure 9:
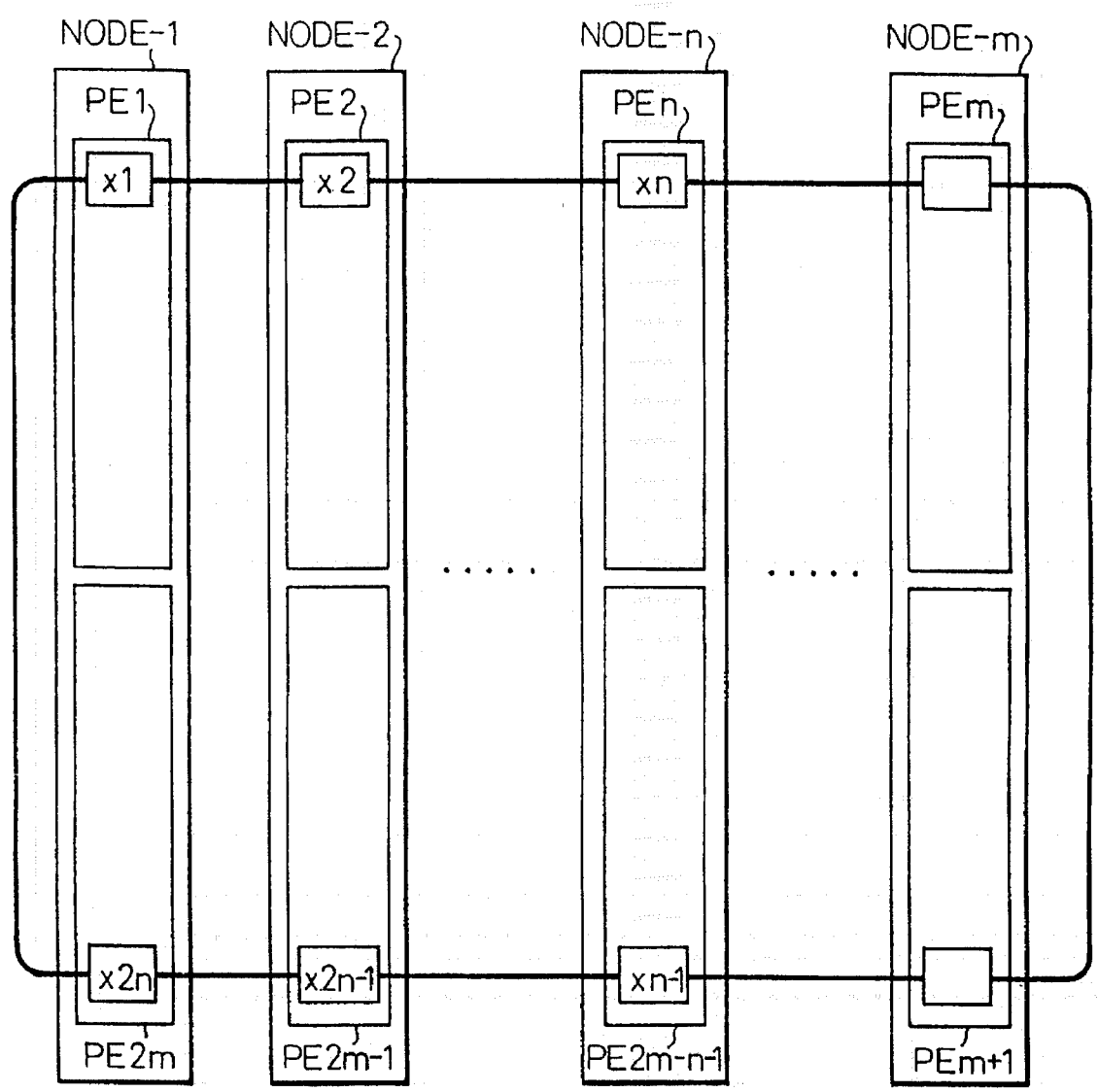
FIG. 9 is a drawing which shows a ring network with a modified configuration of the past.

FIG. 9 shows an example of the configuration of a ring in a ring network which passes through m (>n) nodes, in which the number of nodes has been changed. In this case, the processing elements are numbered PE(1) to PE(2m), and in comparison with the case shown in FIG. 2, processing elements PE(n+1) to PE(2m) are the processing elements which represent the difference between "before the modification" and "after the modification" of the network.

Therefore, with the network configuration shown in FIG. 2, after assigning the processing program to each of the processing elements, and locating data in the processing elements as shown in FIG. 5, if the network configuration is then modified to appear as shown in FIG. 9, the change in processing element numbering requires that data be relocated.

As described above, in the prior art, when the scale of the calculation changes and the network configuration is changed, because the sequence in which each of the processing elements receives data that is flowing in the network changes, it is necessary to relocate the data. Since this can only be performed by the host computer CPU2, which is aware of all the data, it is necessary to interrupt the processing being performed by the parallel computer CPU1 and to update the memories of each of the processing elements, using one or a small number of processors within the host computer CPU2, this at the cost of sacrificing the high-speed performance of the parallel computer.

To avoid the above-described problem, it is possible to use a fixed configuration using a number of processing elements that can handle the largest scale processing of a given series of processing tasks. However, doing this requires that data pass through all the processing elements, even in the case of small-scale processing, thereby wasting unnecessary data transfer time.

For that reason, it is desirable to make use of the characteristics of the ring network to which the present invention is related, which has a ring having an out-going and in-coming path which pass through each node, and to assign processing to each processor without the need to relocate data, even if the processor configuration changes during processing.

The manner in which the present invention assigns processor processing so as to satisfy the above need is described in detail below.

Figure 10:
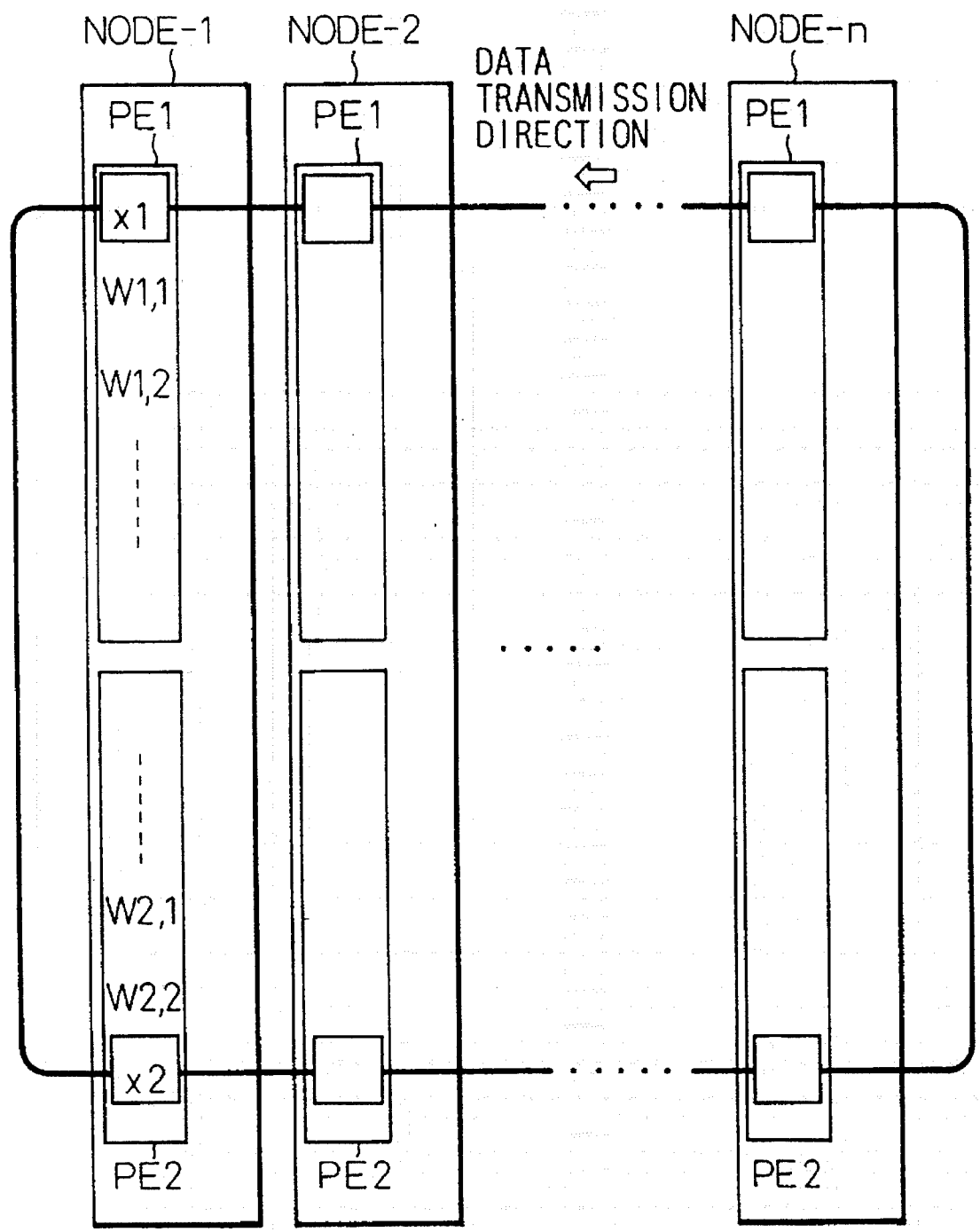
FIG. 10 is a drawing which shows the principle of the present invention.

FIG. 10 shows the principle of the present invention. In this drawing, Node-1, ..., Node-n are the nodes in the ring network, the out-going path and in-coming path of which pass through these nodes, PE(1) and PE(2) are the processing elements in each of these nodes, and each of the nodes Node-1, ..., Node-n has at least two processing elements, PE(1) and PE(2).

To solve the problem noted above, each of the nodes, Node-1, ..., Node-n has at least two processing elements, PE(1) and PE(2), and these nodes form a ring network, the out-going path and incoming path of which pass through these nodes. The processing elements PE(1) and PE(2) of the nodes Node-1, ..., Node-n transfer the data that each holds to each of the processing elements, these forming a parallel computer which executes the processing of this data. The assignment of the processing program by the host processor to the processing elements PE(1) and PE(2) of each node is done so that the data is processed by the processing elements PE(1) and PE(2) provided at each of the nodes, processed data then being transferred sequentially on the network in the node sequence Node-1, ..., Node-n.

In addition, the data assigned by the host processor to the processing elements PE(1) and PE(2) of each node is sequentially assigned to locations starting at PE(1) and PE(2) and proceeding in the node number sequence of Node-1, ..., Node-n.

In the ring network shown in FIG. 10, each node is provided with at least two processing elements, PE(1) and PE(2). In the case in which the data transfer direction is that shown by the arrow in FIG. 10, a processing program which processes data transferred sequentially on the network from processing elements PE(1) and PE(2) will be assigned in the node sequence Node-1, ..., Node-n.

With the transfer direction as shown in this drawing, when data is transferred to each of the processing elements PE(1) and PE(2), each of the processing elements PE(1) and PE(2) performs calculations on the transferred data and the data located in each of these processors, to thereby perform, for example, a matrix multiplication calculation.

Furthermore, by assigning a processing program (which processes data transferred sequentially on the network from processing elements PE(1) and PE(2) the node number sequence Node-1, ..., Node-n, whereas as seen from the ring network, the processor numbers will not appear to be continuous, and transferred data will be out of sequence, it is possible to solve this problem by relocating the data within the processing elements PE(1) and PE(2) and the sequence of calculation. Because this differs from the execution-time rearrangement of data in the prior art, it is possible ignore the influence this has on processing time.

Because, as described above, a processing program is assigned which processes data transferred sequentially on the network from processing elements PE(1) and PE(2) in the node number sequence Node-1, ..., Node-n, in the ring network, it is possible to establish a uniform processor assignment which is not dependent upon the network configuration.

Also, in addition to assigning a processing program which processes data transferred sequentially on the network from processing elements PE(1) and PE(2) in the node number sequence Node-1, ..., Node-n, because data is assigned sequential from each of the processing elements PE(1) and PE(2) in the node sequence Node-1, ..., Node-n, even if the network configuration is changed, there is no need to relocate data at the time of execution, thereby enabling high-speed processing.

Figure 11:
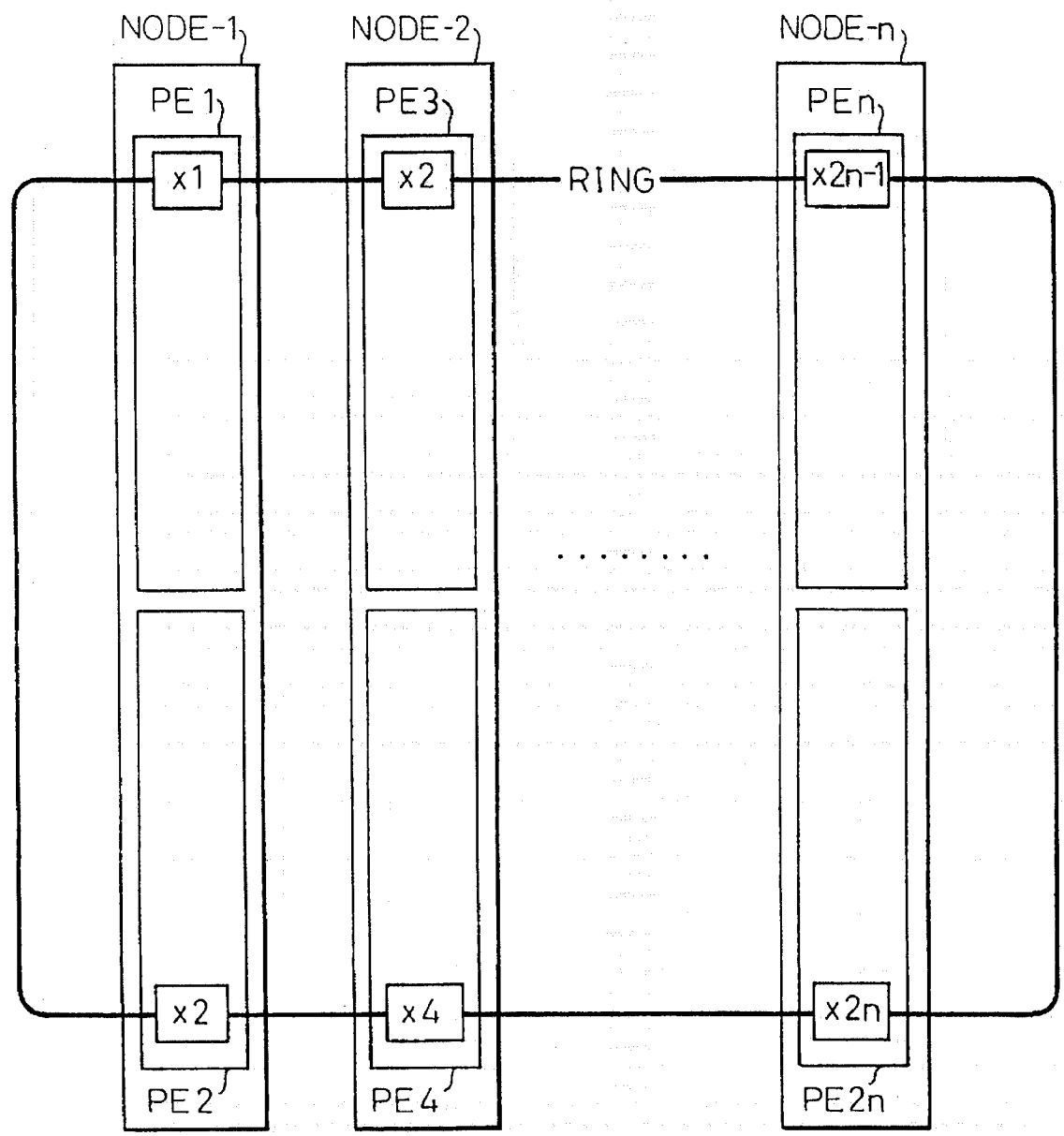
FIG. 11 is a drawing which shows the processing program assignment in the first embodiment of the present invention.

FIG. 11 shows the assignment of a processing program in the first embodiment of the present invention.

Figure 12:
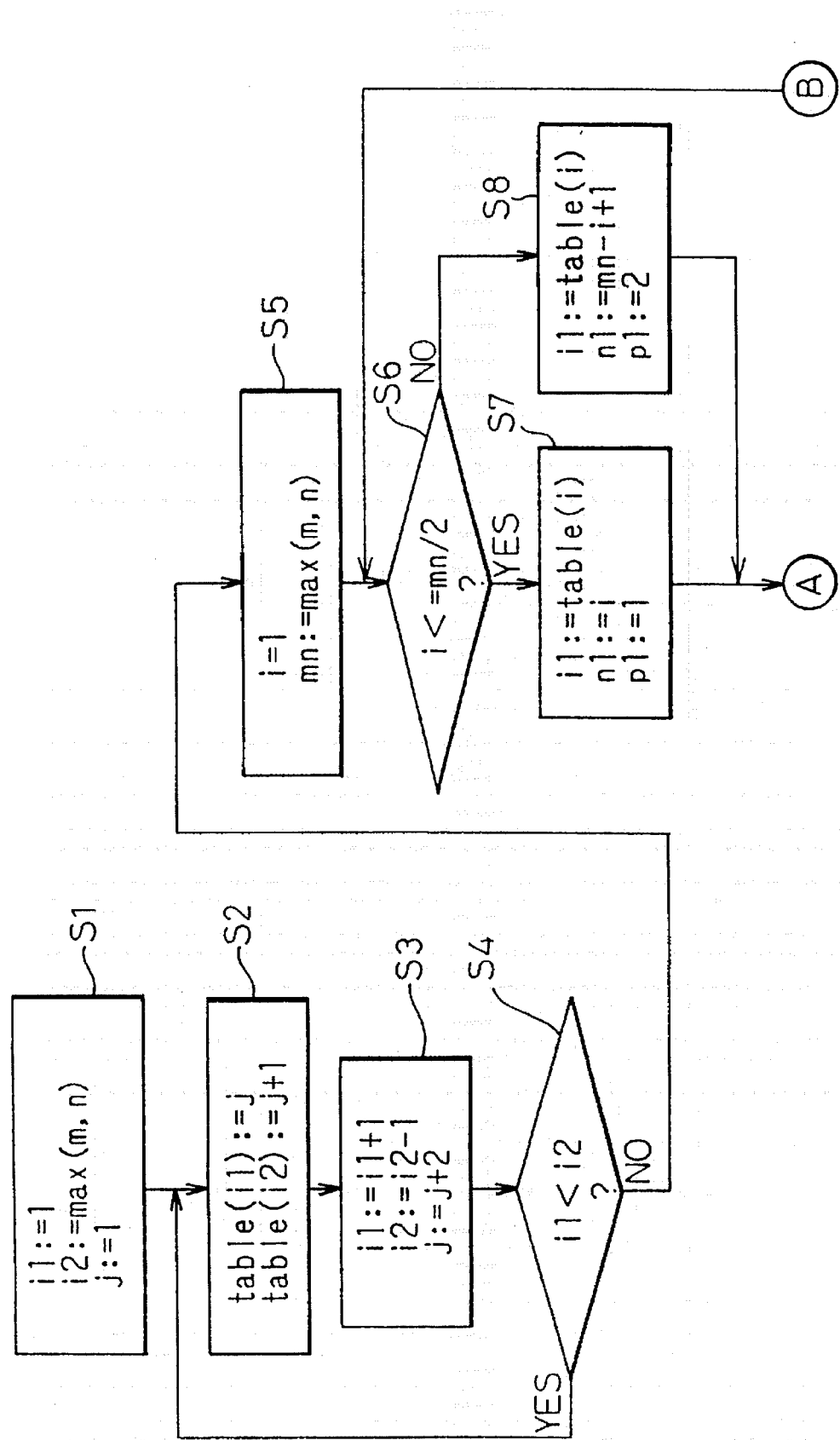
FIG. 12 is a flowchart of data location processing in this embodiment of the present invention.
Figure 13:
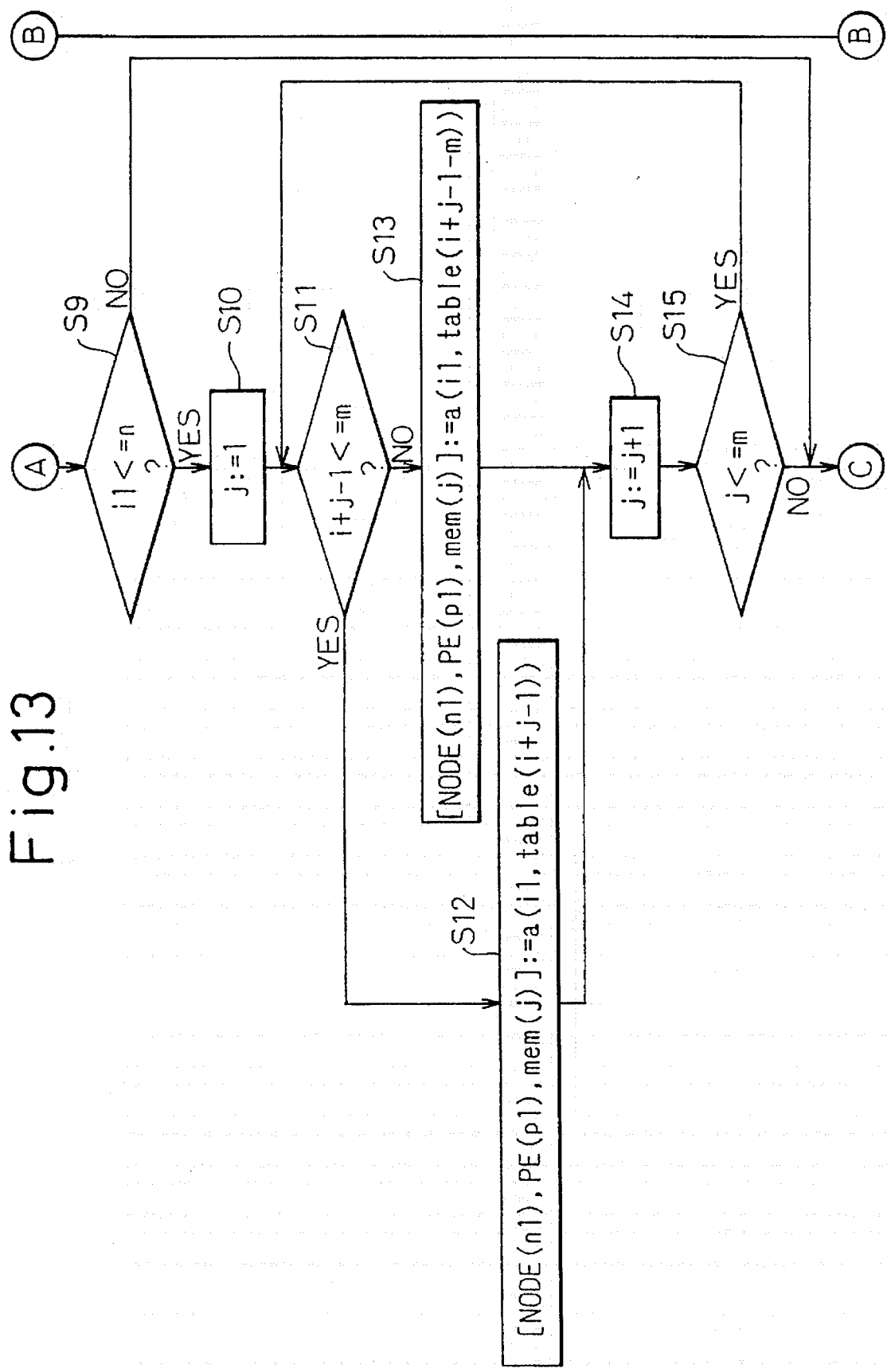
FIG. 13 is a continued flowchart of the data location processing of this embodiment of the present invention.
Figure 14:
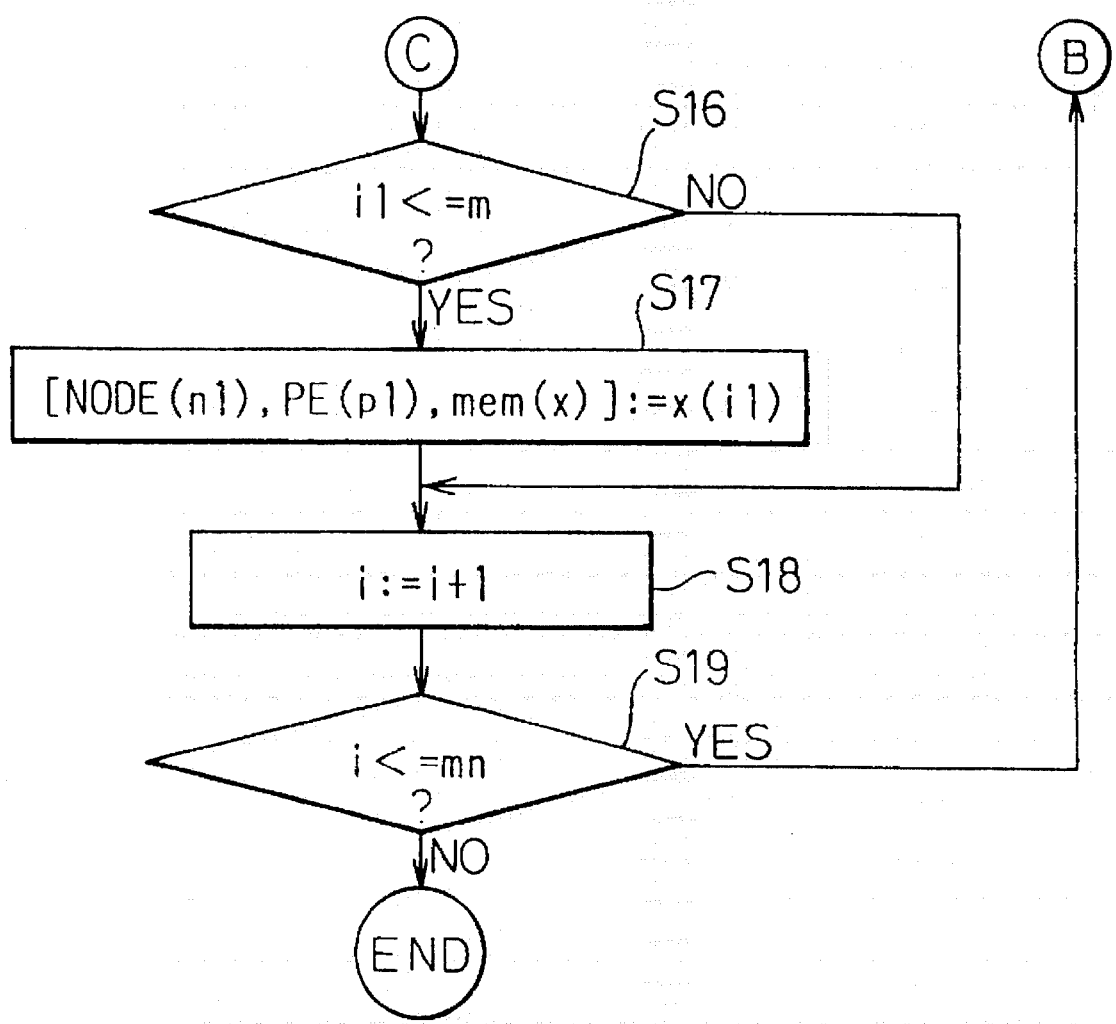
FIG. 14 is a continued flowchart of the data location processing of this embodiment of the present invention.

In FIG. 11, there are two processing elements assigned to each of the nodes from Node-1 to Node-n, with processing elements PE(1) and PE(2) assigned to Node-1, processing elements PE(3) and PE(4) assigned to Node-2, and so on, so that the processing program is assigned in node number sequence to the processing elements from PE(1) to PE(2n). FIG. 12, FIG. 13, and FIG. 14 show the flowchart of processing to locate data into the processing elements of each of the nodes for the purpose of performing the matrix calculation of the above-noted Equation (1). To simplify the flowchart shown in these drawings, as was done in the case of the prior art, both n and m are shown to be even numbers.

Next, the assignment of data into each of the processing elements in the first embodiment of the present invention will be described, using FIGS. 12 to 14. In this case as well, as an aid to understanding, the description will be for the case of m=6 and n=4.

At step S1 in FIG. 12, the settings i1=1, i2-max(m, n), and j=1 are made. Then, at step S2, the settings table(i1)=j and table(i2)=j+1 are made. Next, at step S3, the settings i1=i1+1, i2=i2−1, and j=j+2 are made, and at step S4 the expression i1<i2 is tested. If i1<i2 is true, return is made to step S2, from which the above processing is repeated.

As a result, in the case of m=6 and n=4, the table will be set as follows.

table(1)=1, table(2)=3, table(3)=5 table(4)=6, table(5)=4, table(6)=2

Next, at step S5 the settings i=1 and mn-max(m, n) are made, and at step S6 the expression i≦nm/2 is tested. In the case in which i≦m/2, flow proceeds to step S7, at which the settings i1=table(i), n1=i, and p1=1 are made. As will be explained later, when i is incremented so that i>mn/2, that is, so that i is 4 or greater, the settings i1=table(i), n1-mn-i+1, and p1=2 are made. Therefore, at the beginning, the settings made are i1=1, n1=1, and p1=1.

Next, flow proceeds to step S9 in FIG. 13, at which the expression i1≦n is tested. If i1>n, as described later, flow proceeds to step S16 of FIG. 14. If i1≦n, flow proceeds to step S10, at which the setting j=1 is made, and then to step S11, at which the expression i+j−1≦m is tested.

In the case in which i+j−1≦m, flow proceeds to step S12, at which the setting NODE(hi), PE(p1), mem(j)=a(i1,table(i+j−1)) is made. That is, since table(i+j−1)=table(1)=1, first the a(1,1) data is located in the 1st area of the memory mem of the processing element PE(1) of node Node-1.

Next, flow proceeds to step S14, at which the setting j=j+1 is made, and at step S15 the expression j≦m is tested. If j≦m, return is made to step S11, the above processing being repeated until n=6. By doing this, the a(1,1), a(1,3), a(1, 5), a(1, 6), a(1,4), and a(1, 2) data are located in the 1st through 6th areas of the memory mem of the processing element PE(1) of Node-1.

At step S14, when j is incremented by the setting of j=j+1, since j exceeds 6, flow proceeds from step S15 to step S16 of FIG. 14, at which the expression i≦m is tested. In this case, since i≦m, flow proceeds to step S17, at which the setting of NODE(n1), PE(p1), mem(x)=x(i) is made. That is, the x(1) data is located in the x area of the memory mem of the processing element PE(1) of Node-1.

By performing the above processing, the a(1, 1) to a(1, 2) data as described above are located in the 1st to the 6th areas of the memory mem of the processing element PE(1) of Node-1, and the x(1) data is located in the x area of this memory mem.

Next, at step S18, i is incremented by the setting of i=i+1, and at step S19 the expression i≦mn is tested. If i≦mn, the flow returns to step S6.

This time, since i=2, the settings i1=3, n1=2, and p1=1 are made, and data is located into the memory mem of the processing element PE(1) of Node-2.

That is, in the case of i+j−1≦mn, the flow moves from step S11 to step S12, at which the setting NODE(n1), PE(p1), mem(j)=a(i1, table(i+j−1)) is made. Because table (i+j−1)=table(2)=3, the a(3, 3) data is located into the 1st area of the memory mem of the processing element PE(1) of Node-2.

Next, flow proceeds to step S14, at which j is incremented by the setting j=j+1, and at step S15 the expression j≦m is tested. If j≦m, the flow returns to step S11, the above-noted processing being repeated until j=5. By doing this, the a(3, 5), a(3, 6), a(3, 4), and a(3, 2) data are located into the 2nd to 5th areas of the memory mem of the processing element PE(1) of Node-2.

When j reaches 6, since i+j−1>m, flow proceeds to step S13, at which the setting NODE(n1), PE(p1), mem(j)=a(i1, table(i+j−1)) is made. Since table(i+j−1)=table(1)=1, the a(3, 1) data is located into the 6th area of the memory mem of the processing element PE(1) of Node-2.

Then at step S14, j is incremented by the setting of j=j+1, and since this causes j to exceed 6, flow proceeds from step S15 to step S16 of FIG. 14, at which the expression i≦m is tested. In this case, since i≦m flow proceeds to step S17, at which the setting NODE(n1), PE(p1), mem(x)=x(i) is made. This causes x3 data to be located into the memory mem of the processing element PE(1) of Node-2.

By performing the above-described processing, as described above, the a(3, 3) to a(3,1) data are located into the 1st to 6th areas of the memory mere of the processing element PE(1) of Node-2, and the x(3) data is located into the memory mem x area.

After performing the above-described processing, at step S18, i is incremented by 1 (thereby becoming 3), the expression i<mn is tested at step S19, and the flow returns to step S6.

At step S7, the settings i1=table(3)=5, n1=3, and p1=1 are made, after which flow proceeds to step S9. This time, since i1=5 and i1 is greater than n (in this case 4), at step S16 a test is made of the expression i1<m, and if i1<m flow moves to step S17, at which the setting NODE(n1), PE(p1), mem (x)=x(i) is, made. That is data is not located in the 1st to 6th areas of the memory mere of the processing element PE(1) of Node-3, but x5 data is located in the x area of the memory mem of the processing element PE(1) of Node-3.

Then, at step S18, i is incremented by 1 (making it 4), and at step S19 i<mn is tested, after which the flow returns to step S6.

At step S6, the expression i≦mn/2 is tested, and since i=4 an mn/2=3, flow proceeds to step S8, at which the settings i1=table(4)=6, n1=mn−i+1, and p2=2 are made. Next, flow proceeds to step S9, at which the expression i1≦n is tested, and since i1 (now 6, with n=4) exceeds n, flow proceeds to step S16 where, as was the case above, no data is located in the 1st to 6th areas of the memory mem of the processing element PE(2) of Node-3, and x(6) data is located into the x area of the memory mem of the processing element PE(2) of Node-3.

Next, at step S18, i is incremented by the setting i=i+1, and a test of i≦mn is then made at step S19. In the case in which i≦mn, the flow returns to step S6. This time, since i=5, at step S8 the settings i1=4, n1=2, and p1=2 are made, so that data is located into the memory mem of the processing element PE(2) of Node-2.

Then, as was described previously, data a(4, 4), a(4, 2), a(4, '1), a(4, 3), a(4, 5), and a(4, 6) are located into the 1st to 6th areas of the memory mem of the processing element PE(2) of Node-2, with x(4) data being located into the x area of that memory mem.

Then, when i=6, data a(2, 2), a(2, 1), a(2, '3), a(2, 5), a(2, 6), and a(2, 4) are located into the 1st to 6th areas of the memory mem of the processing element PE(2) of Node-1, with x(2) data being located into the x area of that memory mem.

Then at step S18, i is incremented by 1 so that i>m, so that flow proceeds to END from step S19, this completing the processing.

By performing the above-described processing, the a1, 1 to a(1, 2), a(2, 2) to a(2, 4), a(3, 3) to a(3, 1), and a(4, 4) to a(4, 6) data are located into the 1st to 6th areas of the processing elements PE(1) and PE(2) of Node-1 and of processing elements PE(1) and PE(2) of Node-2, respectively, and data x(1) to x(6) are located into the x areas of processing elements PE(1) of Node-1 through Node-3 and into the x area of processing element PE(2) of Node-1 through Node-3.

Figure 15:
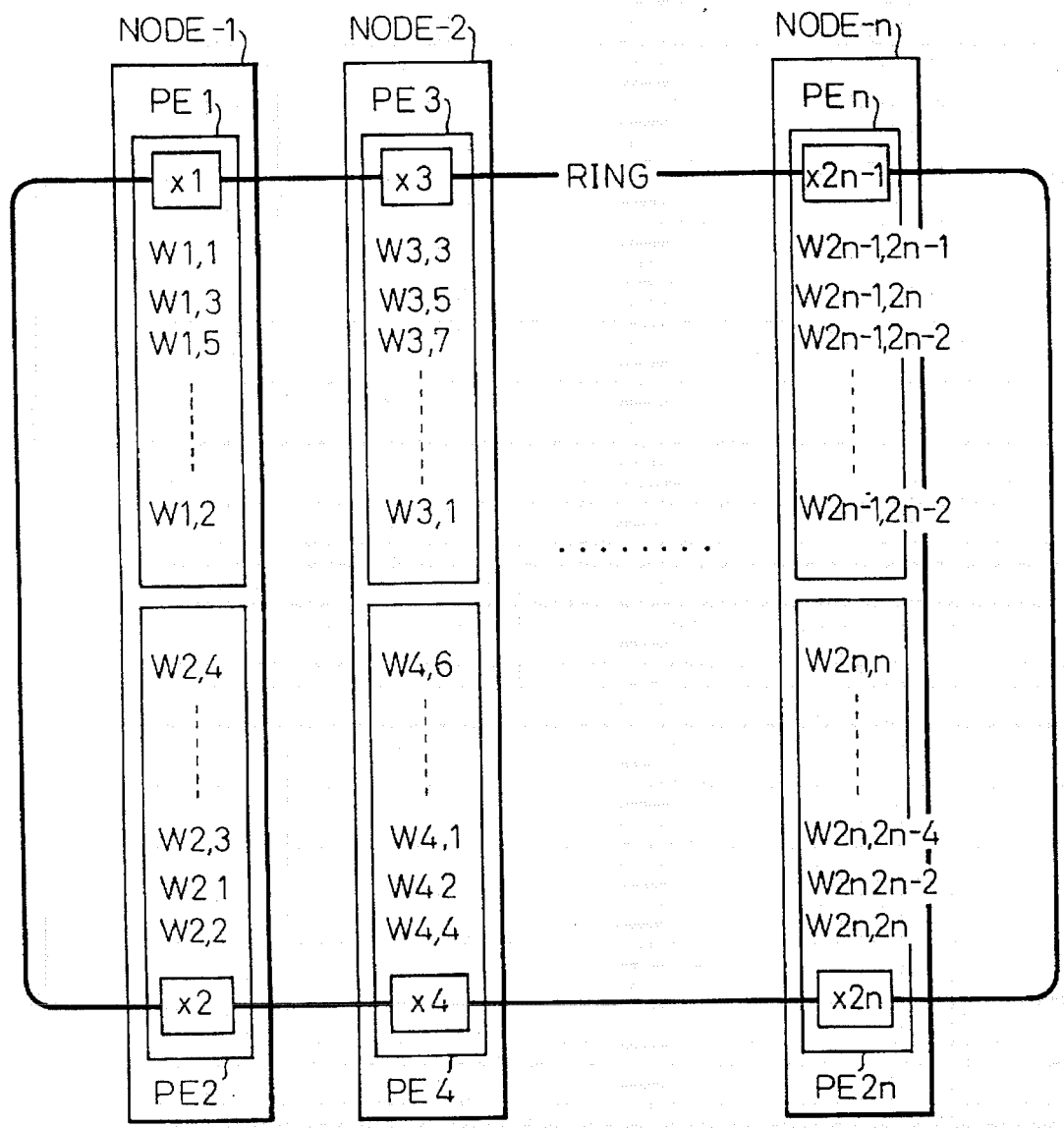
FIG. 15 is a drawing which shows data location in this embodiment.

FIG. 15 shows the data location, in a ring network which has performed the processing program assignment to the processors of FIG. 11, the data location resulting from the above-described processing for the above-noted matrix W having 2n rows and 2n columns and a vector x having 2n elements.

As shown in this drawing, in this embodiment of the present invention, the row elements $W_{ij}$ (i=1, ..., 2n, j=1, ..., 2n) of the matrix W are located in the processing elements PE(1) through PE(2)n, with correspondence to the numbers of processing elements PE(1) to PE(2)n. The elements $x_j$ (n=1, ..., 2n) of the vector x on the ring are in the same manner located so as to correspond to the numbers of the processing elements PE(1) to PE(2)n.

In the case of determining the sum of the products, Wx, of the matrix W having 2n rows and 2n columns and the vector x having 2n elements, in the same manner as previously described in the case of FIG. 5 to FIG. 8, data on the ring is captured, accumulated with elements $W_{ij}$ stored internally, and written in work areas, the overall data on the ring being then shifted as the sum is determined. By performing this processing, although the sequence of calculation differs from that of the prior art, the same results are obtained.

Figure 16:
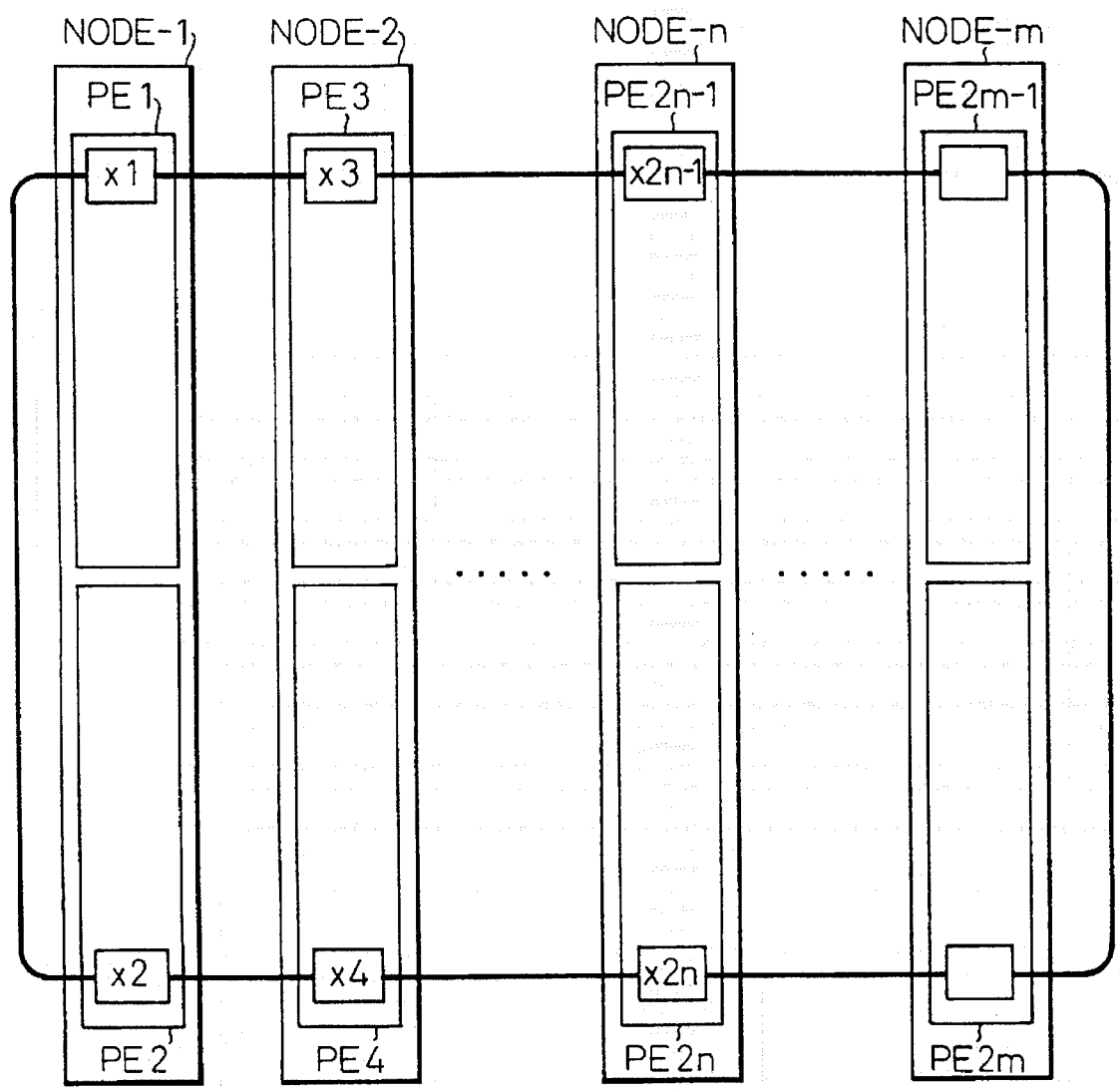
FIG. 16 is a drawing which shows a ring network with a changed configuration in this embodiment of the present invention.

FIG. 16 shows the case of a modified number of nodes on the network, changed from n to m (where m>n). In the case in which the number of nodes is changed, the processing program assignment with regard to the nodes from Node-1 to Node-n is the same as the case of FIG. 11, with new processing elements assigned to the node sequence Node-n+1 to Node-m.

Therefore, after performing the product of the sums calculation of Wx of the matrix W and the vector x as shown in FIG. 15, in the case of determining the sum of the products for a matrix and vector of differing dimensions, assignments can be made to the processing elements of Node-1n+1 to Node-m, and data can be newly assigned to the processing elements of Node-n+1 to Node-m.

That is, Node-1 to Node-n are the same as in the case of FIG. 11, with the processing program and data assigned to the processing elements of Node-n+1 to Node-m, so that it is not necessary to make an overall re-assignment of the processing program and relocation of data to the entire network, as was necessary in the prior art.

Figure 17A:
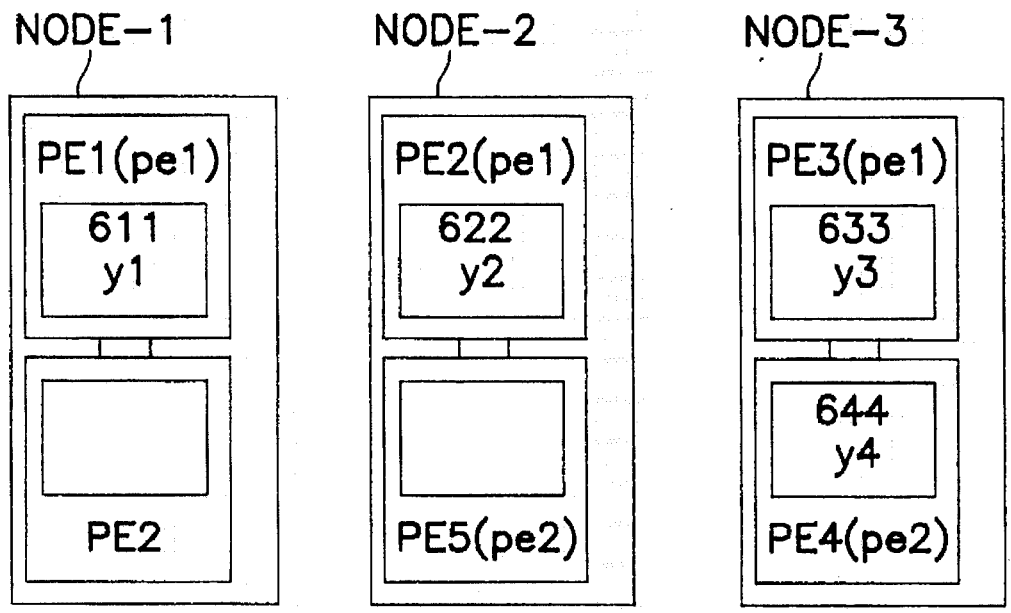
FIG. 17(A) is a drawing which shows the data location in the method of the past.
Figure 17B:
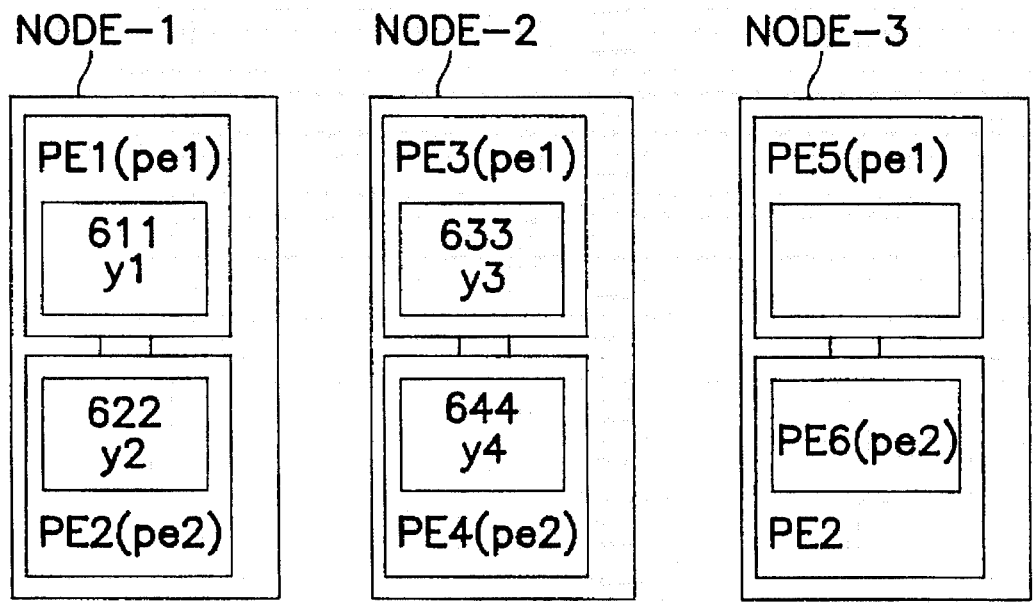
FIG. 17(B) is a drawing which shows the data location in the method of this embodiment of the present invention.

FIG. 17(A) and FIG. 17(B) are drawings which show the processing program assignment and data location in the prior art and in this embodiment of the present invention, respectively. FIG. 17(A) shows the case of the method of the prior art, and FIG. 17(B) shows the method of this embodiment of the present invention. In these drawings, the processing program assignment and data location shown are those for the case in which the sum of the products matrix calculation shown by Equation (2) is calculated for input data consisting of six input values of $x(1), x(2), \ldots, x(6)$ and four output values of $y(1), y(2), \ldots, y(4)$.

$$\begin{pmatrix} y_1 \\ y_2 \\ y_3 \\ y_4 \end{pmatrix} = \begin{pmatrix} a_{11} & a_{12} & a_{13} & a_{14} & a_{15} & a_{16} \\ a_{21} & a_{22} & a_{23} & a_{24} & a_{25} & a_{26} \\ a_{31} & a_{32} & a_{33} & a_{34} & a_{35} & a_{36} \\ a_{41} & a_{42} & a_{43} & a_{44} & a_{45} & a_{46} \end{pmatrix} \begin{pmatrix} x_1 \\ x_2 \\ x_3 \\ x_4 \\ x_5 \\ x_6 \end{pmatrix} \quad (2)$$

As long as we take the data locations before the start of processing, of the two methods, neither is superior or inferior to the other. However, with regard to the results of the calculation $y(1), y(2), \ldots, y(4)$, there is a definite difference if the calculation is performed in accordance with the following Equation 3.

$$\begin{pmatrix} z_1 \\ z_2 \end{pmatrix} = \begin{pmatrix} b_{11} & b_{12} & b_{13} & b_{14} \\ b_{21} & b_{22} & b_{23} & b_{24} \end{pmatrix} \begin{pmatrix} y_1 \\ y_2 \\ y_3 \\ y_4 \end{pmatrix} \quad (3)$$

Figure 18A:
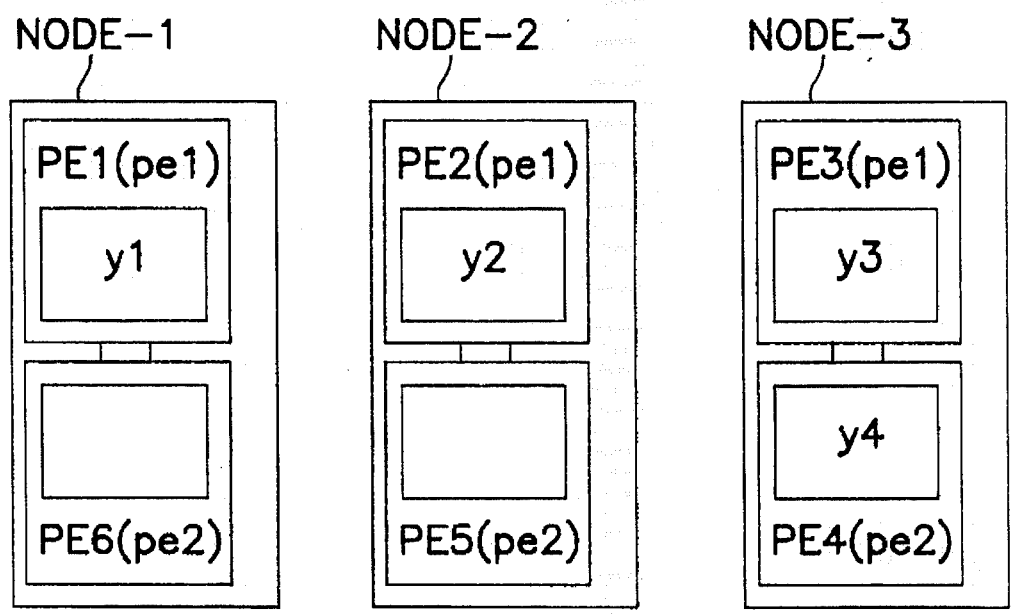
FIG. 18(A) is a drawing which shows the results of processing in the prior art.
Figure 18B:
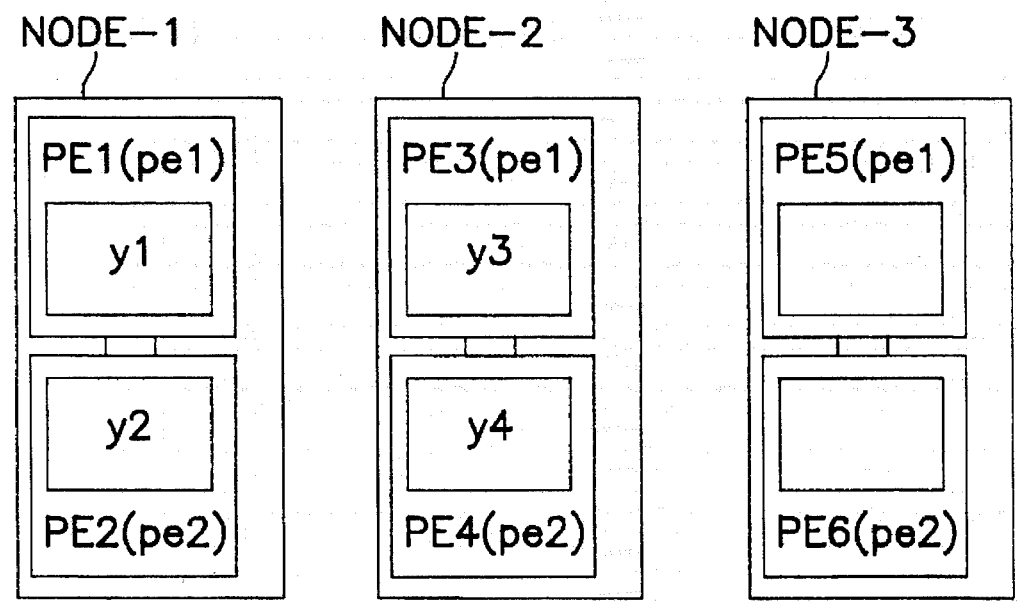
FIG. 18(B) is a drawing which shows the results of processing in the method of this embodiment of the present invention.

FIG. 18(A) and FIG. 18(B) show the results of the calculations of Equation (2), FIG. 18(A) being the case of the prior art and FIG. 18(B) being the case of this embodiment of the present invention. In the prior art method, the output data is located in PE(1) of Node-1 to Node-3 and PE(2) of Node-3, and the case of this embodiment the output data is located in PE(1) and PE(2) of Node-1 to Node-2.

As is shown in FIG. 18(A) and FIG. 18(B), in the prior art method, because y(3) and y(4) remain in Node-3, even though this is processing that can be performed by processing elements of nodes up to Node-2, it is necessary to either perform processing with nodes up to Node-3, which include six processing elements, or else first read the data at the host computer, and then relocate the data in nodes Node-1 and Node-2, following the flowchart shown in FIG. 3 and FIG. 4 along with the Equation (3) matrix data $b(11), \ldots, b(24)$.

In contrast to this prior art method, in this embodiment of the present invention, since the $y(1), y(2), \ldots, y(4)$ are substantially the same as the original data $x(1), x(2), \ldots, x(6)$, by locating the matrix data $b(11), \ldots, b(24)$ beforehand, it is possible to shorten the calculation processing.

Figure 19:
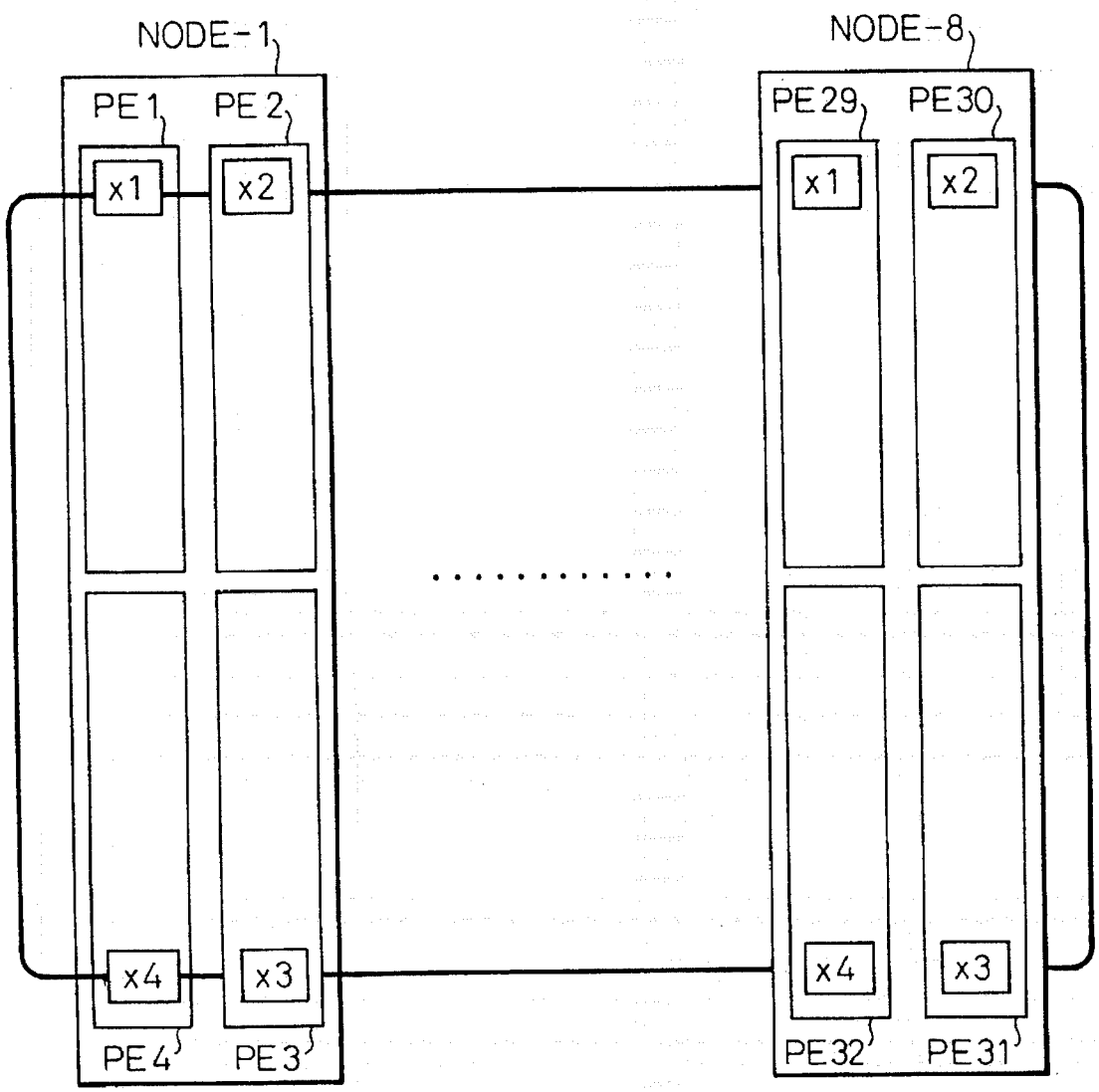
FIG. 19 shows the second embodiment of the present invention.

FIG. 19 shows the second embodiment of the present invention, in which four processing elements are provided at each node, a ring network being formed between a maximum of eight nodes.

In this second embodiment as well, the assignment with respect to the processing elements PE(1) to PE(32) of the nodes Node-1 to Node-8 is performed in the node sequence, in the same manner as shown in FIG. 11 for the first embodiment.

In the case of determining the sum of the products for a matrix and a vector such as shown in FIG. 15, similar to the case of FIG. 15, the row elements of the matrix $W_{ij}$ are located into the processing elements from PE(1) to PE(32), with correspondence established with the numbers of the processing elements, and the elements of x on the ring are, in the same manner, located into the processing elements PE(1) to PE(32), with correspondence established with the numbers of the processing elements.

By doing this, it is possible to determine the sum of the products for the matrix and the vector using the same procedure as described above.

As described above, in the case in which two or more processing elements are provided at each node, it is possible to apply the present invention to the second embodiment in the same manner as with the first embodiment.

As described above, in the present invention, because the processing program is assigned to processing elements of the nodes in node sequence without concern for the data transfer direction, it is possible in a ring network to easily change the configuration of the network. Also, by locating data into the processing elements in node sequence, even if the network configuration changes, there is no need to relocate data at execution time, making it possible to perform high-speed processing.

What is claimed is:

1. A parallel computer comprising:

a sequence of adjacent nodes in which each node has first and second processing elements, the processing elements forming a single ring data path by connecting an out-going path of each processing element to an in-coming path of an adjacent processing element, wherein the out-going path of the first processing element of the first node connects to the in-coming path of the second processing element of the first node and the out-going path of the second processing element of the last node connects to the in-coming path of the first processing element of the last node; and a processing program for sequentially assigning first matrix data elements to sequentially adjacent processing elements along the single ring data path and for sequentially assigning second matrix data element groups to the processing elements of the sequence of nodes such that the second matrix data element groups are assigned in an order of first and second processing elements of a sequentially assigned node before assignment of subsequent second matrix data element groups to the processing elements of subsequent sequential nodes.

2. The parallel computer according to claim 1, wherein:

each node has a third processing element connected to the first processing element and a fourth processing element connected to the second processing element, each third and fourth processing element forming the single ring data path; and the processing program controls data storage to sequentially assign the second matrix data element groups to the first, second, third, and fourth processing elements of each sequential node.

3. The parallel computer according to claim 1, wherein:

the processing program accumulates the first matrix data elements with respectively corresponding first data elements of the second matrix data element groups in each processing element having an assigned first matrix data element and an assigned second matrix data element, and stores an accumulation result in a corresponding processing element storage area.

4. A parallel computer comprising:

a sequence of adjacent sequential nodes in which each node has first and second processing elements, the processing elements being connected to form a single ring data path with each processing element connected to an adjacent processing element; and a processing program for sequentially assigning first matrix data elements to adjacent processing elements along the single ring data path and sequentially assigning second matrix data element groups to the first and the second processing elements of each sequential node along the sequence of adjacent nodes, and for accumulating the assigned first matrix data elements with a corresponding first element of the assigned second matrix data element groups.

5. The parallel computer according to claim 4, wherein:

each node has a third processing element connected to the first processing element and a fourth processing element connected to the second processing element, the third and fourth processing elements forming the single ring data path; and the processing program controls data storage to sequentially assign the second matrix data element groups to the first, second, third, and fourth processing elements of each sequential node.

6. A parallel computer comprising:

a sequence of adjacent nodes, each node including first and second processing elements and each processing element including a memory, wherein the first processing element of the first node is connected to the second processing element of the first node, the second processing element of the last node is connected to the first processing element of the last node, all first processing elements are connected to an adjacent first processing element and all second processing elements are connected to an adjacent second processing element such that the connected processing elements form a single ring data path;

means for sequentially assigning first matrix data elements to adjacent processing elements along the single ring data path;

means for sequentially assigning second matrix data element groups to the sequential nodes such that the first and second processing elements of each node are assigned with a respectively corresponding second matrix data element group before subsequent second matrix data element groups are assigned to the processing elements of a next sequential node; and means for accumulating the first matrix data elements with respectively corresponding first elements of the second matrix data element groups in each processing element and storing a result of accumulation in a respectively corresponding processing element memory.

7. The parallel computer according to claim 6, further comprising:

means for sequentially advancing the first matrix data elements along the single ring data path; and means for accumulating the advanced first matrix data elements with second elements of the respectively corresponding second matrix data element groups and storing a result of accumulation in a respectively corresponding processing element memory.

8. The parallel computer according to claim 6, further comprising:

means for sequentially advancing the first matrix data elements along the single ring data path; and means for accumulating the advanced first matrix data elements with second elements of the respectively corresponding second matrix data element groups to form respectively corresponding second results, adding the second results to the respectively corresponding stored result from the respectively corresponding processing element memory to form third results, and storing the third results in the respectively corresponding processing element memory.

9. A parallel computer formed as a sequence of adjacent nodes, each node including first and second processing elements and each processing element including a memory, wherein the first processing element of the first node is connected to the second processing element of the first node, the second processing element of the last node is connected to the first processing element of the last node, each first processing element is connected to an adjacent first processing element and each second processing element is connected to an adjacent second processing element such that the connected processing elements form a single ring data path, said parallel computer comprising:

means for assigning a first vector data element of a vector to the first processing element of the first node and for sequentially assigning remaining vector data elements of the vector to successively adjacent processing elements along the single ring data path; and means for assigning a first matrix data column of a matrix to the first processing element of the first node and for assigning a second matrix data column of the matrix to the second processing element of the first node, and for sequentially assigning remaining matrix data columns of the matrix to the first and second processing elements of each subsequent sequential node.

10. The parallel computer according to claim 9, further comprising:

means for accumulating each assigned vector data element with each first matrix data element of the assigned matrix data columns; and means for storing each result of accumulation in each corresponding processing element memory.

11. The parallel computer according to claim 10, further comprising:

means for sequentially re-assigning each vector data element to a sequentially adjacent processing element along the single ring data path;

means for selecting a next matrix data element from each assigned matrix data column; and means for accumulating each sequentially re-assigned vector data element with a corresponding selected data element to produce corresponding second results of accumulation.

12. The parallel computer according to claim 11, wherein:

each second result of accumulation is added to each corresponding stored result from each processing element memory to produce corresponding third results of accumulation; and each third result of accumulation is stored in each corresponding processor element memory.

13. A method of programming a parallel computer formed as a sequence of nodes, each node including first and second processing elements and each processing element including a memory, wherein the first processing element of the first node is connected to the second processing element of the first node, the second processing element of the last node is connected to the first processing element of the last node, each first processing element is connected to an adjacent first processing element and each second processing element is connected to an adjacent second processing element such that the connected processing elements form a single ring data path, said method comprising the steps of:

a) sequentially assigning first matrix data elements to adjacent processing elements along the single ring data path;

b) sequentially assigning second matrix data element groups to the sequential nodes such that the first and second processing elements of each node are assigned with a respectively corresponding second matrix data element group before subsequent second matrix data element groups are assigned to the processing elements of a next sequential node;

c) accumulating each first matrix data element with a corresponding first element of the second matrix data element groups; and d) storing each corresponding result in each corresponding processing element memory.

14. The method of programming a parallel computer according to claim 13, further comprising the steps of:

e) sequentially re-assigning each vector data element to a sequentially adjacent processing element along the single ring data path;

f) selecting a next matrix data element from each assigned matrix data column; and g) accumulating each sequentially assigned vector data element with a corresponding next data element to produce a second corresponding result of accumulation.

15. The method of programming a parallel computer according to claim 14, further comprising the steps of:

h) adding each second result of accumulation to each corresponding stored result from each processing element memory to produce a corresponding third result of accumulation; and i) storing the third result of accumulation in each corresponding processor element memory.

16. The method of programming a parallel computer according to claim 15, further comprising the steps of:

j) repeating steps "e" through "i" until each vector data element has been accumulated with a data element from each assigned matrix data column.

* * * * *

UNITED STATES PATENT AND TRADEMARK OFFICE
CERTIFICATE OF CORRECTION

PATENT NO. : 5,715,471
DATED : Feb. 3, 1998
INVENTOR(S) : OKSUKA et al.

It is certified that error appears in the above-identified patent and that said Letters Patent is hereby corrected as shown below:

Col. 4, line 37, change "mn-max(m, n)" to --mn=max(m, n)--; and change "ran" to --mn--;
lines 53, 59 and 62, change "mere" to --mem--.

Col. 5, lines 12, 21, 22, 28, 37, 46 and 49, change "mere" to --mem--.

Col. 8, line 36, change "mn-max(m, n)" to --mn=max(m, n)--;
line 50, change "NODE(hi)" to --NODE(n1)--.

Col. 9, lines 39 and 52, change "mere" to --mem--.

Col. 10, line 8, change "a(4, '1)" to --a(4, 1)--;
line 12, change "a(2, '3)" to --a(2, 3)--;
line 19, change "a1, 1" to --a(1, 1)--;
lines 37, 38 and 41, change "PE(2)n" to --PE(2n)--.

Signed and Sealed this

Twenty-eighth Day of July, 1998

Attest:

Attesting Officer

BRUCE LEHMAN

Commissioner of Patents and Trademarks